(12) United States Patent
Bernelas et al.

(10) Patent No.: US 11,144,840 B2
(45) Date of Patent: Oct. 12, 2021

(54) COMPLETING DECISION LOGIC TO AVOID A SIDE EFFECT

(71) Applicant: INTERNATIONAL BUSINESS MACHINES CORPORATION, Armonk, NY (US)

(72) Inventors: Jean-Michel G. B. Bernelas, Valbonne (FR); Ulrich M. Junker, Biot (FR); Remi Van Keisbelck, Nice (FR)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 16/046,365

(22) Filed: Jul. 26, 2018

(65) Prior Publication Data
US 2020/0034728 A1    Jan. 30, 2020

(51) Int. Cl.
| | | |
|---|---|---|
| *G06N 5/04* | (2006.01) | |
| *G06F 11/36* | (2006.01) | |
| *G06F 16/24* | (2019.01) | |
| *G06F 9/45* | (2006.01) | |

(52) U.S. Cl.
CPC .................................. *G06N 5/045* (2013.01)

(58) Field of Classification Search
CPC ..... G06N 5/045; G06N 5/006; G06F 11/3604
USPC ...................................................... 706/1–62
See application file for complete search history.

(56) References Cited

U.S. PATENT DOCUMENTS

| | | | | |
|---|---|---|---|---|
| 6,550,059 | B1* | 4/2003 | Choe ....................... | G06F 8/447 |
| | | | | 717/149 |
| 7,860,902 | B2 | 12/2010 | Brendle et al. | |
| 8,225,299 | B2 | 7/2012 | Takeuchi | |
| 8,694,978 | B1 | 4/2014 | Rus et al. | |
| 9,535,821 | B1 | 1/2017 | Delarue et al. | |
| 2006/0242115 | A1* | 10/2006 | Baras ....................... | G06F 8/437 |
| 2010/0083240 | A1* | 4/2010 | Siman ................... | G06F 16/245 |
| | | | | 717/144 |
| 2010/0153933 | A1* | 6/2010 | Bohlmann ................ | G06F 8/43 |
| | | | | 717/144 |
| 2012/0311550 | A1 | 12/2012 | Kawahito | |
| 2013/0074057 | A1 | 3/2013 | Gounares et al. | |
| 2014/0047538 | A1* | 2/2014 | Scott ................... | G06F 11/3604 |
| | | | | 726/22 |

(Continued)

OTHER PUBLICATIONS

Cousot, Patrick et al; Abstract Interpretation: A Unified Lattice Model for Static Analysis of Programs by Construction or Approximation of Fixpoints; Fourth ACM Symposium on Principles of Programming Languages; Jan. 17-19, 1977; pp. 238-252.

*Primary Examiner* — Brandon S Cole
(74) *Attorney, Agent, or Firm* — Schmeiser, Olsen & Watts; Brian M. Restauro

(57) ABSTRACT

An approach is provided for completing a decision logic. For statements in a syntax tree of the decision logic and using a symbolic execution technique, path expression(s) that refer to respective input object(s) are identified. A statement in the decision logic is detected that modifies an attribute value of a path expression included in the path expression(s) and that refers to an input object included in the input object(s). A copy instruction is inserted as a new node in the syntax tree so that the attribute value of the path expression is a copy of the input object. Responsive to inserting the copy instruction, the path expression is prevented from modifying the input object.

17 Claims, 12 Drawing Sheets

(56) References Cited

U.S. PATENT DOCUMENTS

| | | | |
|---|---|---|---|
| 2014/0351281 A1* | 11/2014 | Tunstall-Pedoe | G06N 5/02 |
| | | | 707/760 |
| 2015/0222730 A1* | 8/2015 | Gower | H04L 65/607 |
| | | | 709/203 |
| 2017/0068609 A1* | 3/2017 | Chavez | G06F 11/3608 |
| 2020/0034728 A1* | 1/2020 | Bernelas | G06F 11/3604 |

* cited by examiner

| Textual representation | Internal representation |
|---|---|
| e1: Empty path expression — the custom config | (custom config) |
| e2: non-empty path expression — the quantity of the memory of the custom config | (quantity) → (memory) → (custom config) |
| e3: reduction of path expression e2 — the memory of the custom config | (memory) → (custom config) |
| e4: result of substituting e1 in e3 by x — the memory x | (memory) → (x) |

FIG. 7

| | Abstract state (frozen path expressions) | Next statement | Side-effect |
|---|---|---|---|
| 1 | | A1: set custom config to a new PC config | no |
| 2 | the product id of the custom config (A2) | A2: the product id is ... | no |
| 3 | the product id of the custom config (A2) | A3: the cpu is the standard CPU | no |
| 4 | the product id of the custom config (A2)<br>the cpu of the custom config (A3) | A4: the memory is the standard memory | no |
| 5 | the product id of the custom config (A2)<br>the cpu of the custom config (A3)<br>the memory of the custom config (A4) | r1: if the options contain "Boosted CPU" then ... | no |
| ... | ... | ... | |
| 14 | the product id of the custom config (A2)<br>the cpu of the custom config (A3)<br>the memory of the custom config (A4) | r2: if the options contain "Double Memory" then ... | no |
| 15 | the product id of the custom config (A2)<br>the cpu of the custom config (A3)<br>the memory of the custom config (A4) | A13: set the quantity of the memory of the custom config to ... | yes |
| 16 | the product id of the custom config (A2)<br>the cpu of the custom config (A3) | | |

*FIG. 9*

COMPLETING DECISION LOGIC TO AVOID A SIDE EFFECT

BACKGROUND

The present invention relates to task automation, and more particularly to automatically completing decision logic to avoid side effects.

Automation of tasks may be data-driven or decision-driven. Decision-driven task automation requires that a domain expert, analyst, or other skilled person decide which actions to choose dependent on given cases, which establishes a decision logic. The decision logic subsequently is expressed in a programming language. Additional technical decisions may be necessary to successfully express the decision logic in the programming language. For example, technical decisions may be needed to determine how to represent the objects of discourse over which the logic is formulated and how to manipulate the resulting data structures. These technical decisions are beyond the scope of interest of the domain expert or analyst who focuses on defining the decision logic with an expectation that the decision logic will work as expected without additional technical decisions.

SUMMARY

In one embodiment, the present invention provides a method of completing a decision logic. The method includes a computer identifying one or more path expressions that refer to respective one or more input objects. The step of identifying the one or more path expressions (i) is performed for statements in a syntax tree of the decision logic and (ii) uses a symbolic execution technique. The method further includes the computer detecting a statement in the decision logic that modifies an attribute value of a path expression that is included in the identified one or more path expressions and that refers to an input object included in the one or more input objects. The method further includes the computer inserting a copy instruction as a new node in the syntax tree so that the attribute value of the path expression is a copy of the input object. The method further includes in response to the step of inserting, the computer preventing the path expression from modifying the input object.

In another embodiment, the present invention provides a computer program product for completing a decision logic. The computer program product includes a computer readable storage medium. Computer readable program code is stored in the computer readable storage medium. The computer readable storage medium is not a transitory signal per se. The computer readable program code is executed by a central processing unit (CPU) of a computer system to cause the computer system to perform a method. The method includes the computer system identifying one or more path expressions that refer to respective one or more input objects. The step of identifying the one or more path expressions (i) is performed for statements in a syntax tree of the decision logic and (ii) uses a symbolic execution technique. The method further includes the computer system detecting a statement in the decision logic that modifies an attribute value of a path expression that is included in the identified one or more path expressions and that refers to an input object included in the one or more input objects. The method further includes the computer system inserting a copy instruction as a new node in the syntax tree so that the attribute value of the path expression is a copy of the input object. The method further includes in response to the step of inserting, the computer system preventing the path expression from modifying the input object.

In another embodiment, the present invention provides a computer system including a central processing unit (CPU); a memory coupled to the CPU; and a computer readable storage device coupled to the CPU. The storage device includes instructions that are executed by the CPU via the memory to implement a method of completing a decision logic. The method includes the computer system identifying one or more path expressions that refer to respective one or more input objects. The step of identifying the one or more path expressions (i) is performed for statements in a syntax tree of the decision logic and (ii) uses a symbolic execution technique. The method further includes the computer system detecting a statement in the decision logic that modifies an attribute value of a path expression that is included in the identified one or more path expressions and that refers to an input object included in the one or more input objects. The method further includes the computer system inserting a copy instruction as a new node in the syntax tree so that the attribute value of the path expression is a copy of the input object. The method further includes in response to the step of inserting, the computer system preventing the path expression from modifying the input object.

BRIEF DESCRIPTION OF THE DRAWINGS

FIG. 7 depicts examples of path expressions and operations on path expressions used in the processes of FIG. 2 and FIG. 3, in accordance with embodiments of the present invention.

FIG. 9 depicts an example of a trace of abstract execution of statements in the process of FIG. 2, in accordance with embodiments of the present invention.

DETAILED DESCRIPTION

Overview

Figure 1:
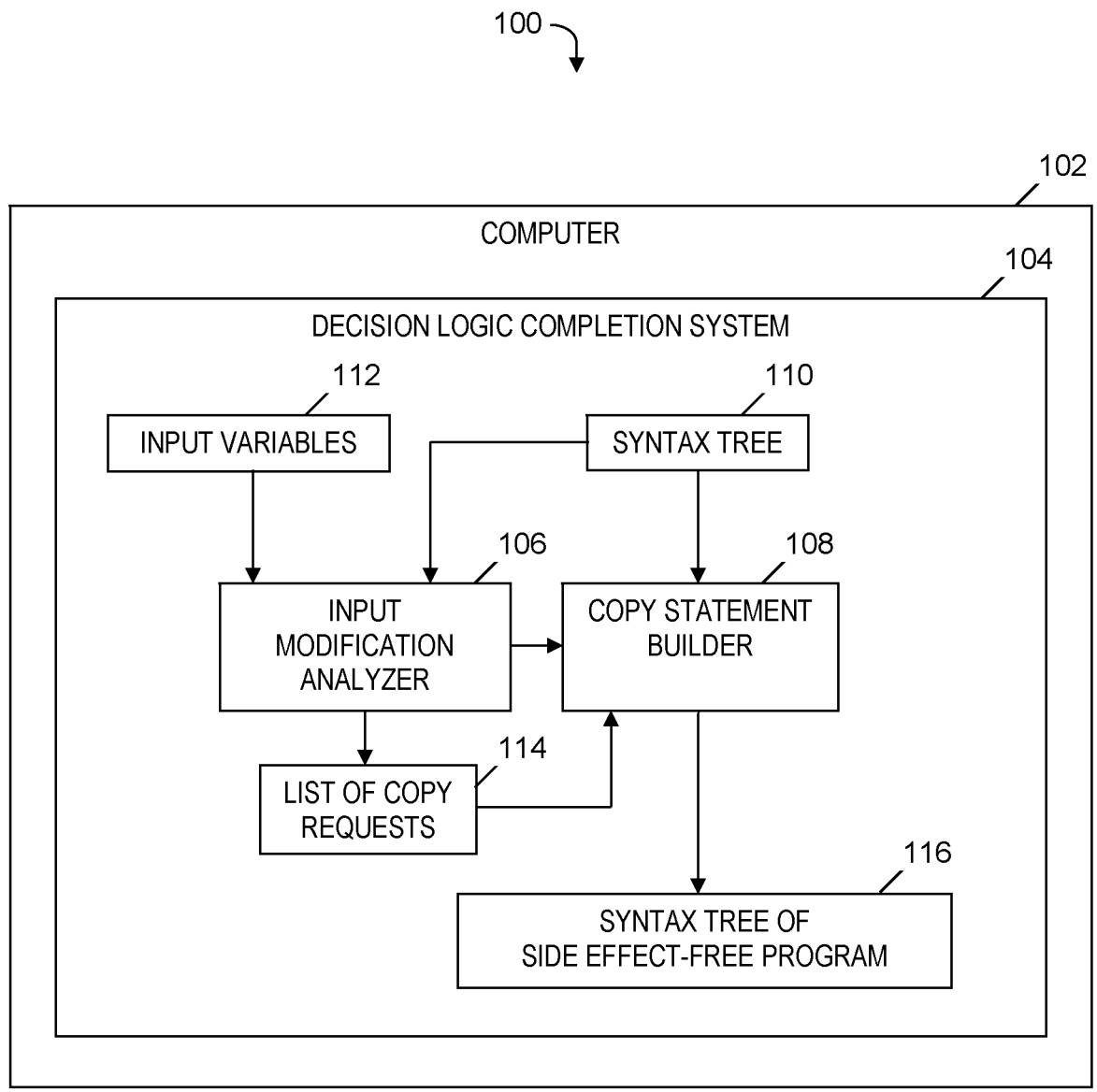
FIG. 1 is a block diagram of a system for completing a decision logic to avoid side effects, in accordance with embodiments of the present invention.

A program processing a piece of decision logic is expected to not modify input objects because these input objects may be used by programs processing other pieces of the decision logic and modifying these input objects would cause undesirable side effects. Conventional data-flow programming languages uphold a principle of avoiding modification of inputs when processing decision logic by systematically and exhaustively copying all the inputs to a node in a data-flow graph before the processing starts. This known technique of systematically and exhaustively copying all the inputs may negatively impact the decision logic. For example, the decision logic of a node in the data-flow graph tests if two objects are the same or not and these two objects have been received from different, multiple predecessor nodes in the data-flow graph. Both of the objects represent the same complex object (e.g., an itinerary in a list of possible itineraries from a start to a destination). In this case, the two objects are no longer equal even if the objects stem from the same input to the data-flow graph because the objects have been received via different predecessor nodes and copied multiple times. The decision logic is unable to take the normal steps of evaluating the two objects as equal and taking the appropriate action.

Thus, the conventional systematic and exhaustive copying technique can alter the decision logic. Furthermore, the conventional systematic and exhaustive copying technique can be prohibitive from a computational point view (i.e., copying complex objects consisting of a significant number of components can have a non-negligible cost).

In one known approach for addressing the side effects, a system alerts the user about the side effects and asks for an explicit repair. This solution can be conveniently performed by a programmer, but not by a non-programmer analyst who initially formulates the decision logic and who does not understand why the repair is needed.

In another known approach, the side effects may be forbidden by a pure functional programming language such as ML (Meta Language) and its derivatives. This approach induces the complexity penalty since complex data structures need to be copied systematically whenever one if their elements is going to be modified.

As discussed above, the aforementioned known techniques provide unique challenges in avoiding the side effects caused by decision logic formulated by non-programmer analysts or domain experts. These unique challenges are overcome by embodiments of the present invention that complete a decision logic that was initially formulated by a non-programmer analyst or domain expert, where the completion of the decision logic eliminates side effects by inserting a minimum number of copy statements into the decision logic. Inserting the minimum number of copy statements minimizes the impact of the inserted copy statements on the subsequent decision logic (i.e., the equality tests between objects in the decision logic that are no longer satisfied due to the inserted copy statements). Furthermore, inserting the minimum number of copy statements avoids systematic and exhaustive copying and thus avoids the computational penalties resulting from the known approaches that employ systematic and exhaustive copying.

In one or more embodiments, a system is provided with a list of input variables and the abstract syntax tree (AST) (herein also referred to as a syntax tree) of the program that potentially has side effects on one or more of the input variables. One or more embodiments use symbolic execution (i.e., abstract interpretation) techniques to determine which of the computed objects are referring to input objects (i.e., the values of input variables as well as their subobjects). One or more embodiments determine whether any statement of the program modifies an attribute value of an input-referring object. One or more embodiments create a copy request that indicates the statement that caused the input reference and the statement that leads to the side effect, where creating the copy request is performed in response to determining that a statement modifies the aforementioned attribute value. After creating the copy request, a corresponding copy statement is generated and inserted into the AST according to a copying policy. In one embodiment, the copying policy is selected from (1) inserting the copy statement as early as possible in a chain of statements of the program that would cause the side effect or (2) inserting the copy statement as late as possible in the aforementioned chain of statements of the program, just before the program would cause the side effect.

In one or more embodiments, a domain expert or analyst expresses the decision logic for automating a task without having to consider whether or not objects need to be copied to avoid side effects. One or more embodiments complete a decision logic to avoid side effects, which guarantees that a given contract that enforces non-modification of objects is satisfied while offering a high degree of freedom for expressing the decision logic.

System for Completing a Decision Logic to Avoid Side Effects

FIG. 1 is a block diagram of a system 100 for completing a decision logic to avoid side effects, in accordance with embodiments of the present invention. System 100 includes a computer 102, which executes a software-based decision logic completion system 104, which includes a software-based input modification analyzer 106 and a software-based copy statement builder 108.

Input modification analyzer 106 receives a syntax tree 110 of a program (i.e., an abstract syntax tree (AST) of a program) and a list of names of input variables 112 as inputs.

Input modification analyzer 106 detects input modification and a potential side effect in the program by identifying statements in the program that can modify the attribute values of input objects (i.e., the objects that can be accessed from an input variable). Input modification analyzer 106 works with an abstract state (i.e., set of frozen path expressions, as discussed below) and performs an abstract or symbolic execution of the program, which is valid for all possible inputs to the program. A detection by input modification analyzer 106 of a statement that leads to a potential side effect falls into one of three cases:

1. The problematic statement modifies the value of the input variable.

2. The problematic statement modifies the attribute value of a path expression that involves an input variable.

3. The problematic statement modifies the attribute value of a path expression that involves a computed variable, but this path expression is frozen. In this case, the path expression refers to (i) an input object (i.e., the path expression has an input object as a value) or (ii) a sub-object of an input object (i.e., the path expression has a sub-object of an input object as a value). The section entitled Non-modifiable path expression, presented below, includes the meaning of the term "frozen" and "frozen path expression," as used herein.

For the first and second cases listed above, input modification analyzer 106 signals an error because the input modification cannot be repaired by inserting a copy statement. For the third case listed above, decision logic completion system 104 avoids the side effect by breaking the equality between the path expression and the input object. Input modification analyzer 106 creates a copy request and adds the copy request to a list of copy requests 114. The copy request indicates the statement that leads to the side effect as well as other statements that caused the path expression to be frozen.

Copy statement builder 108 uses the list of copy requests 114 as input to insert copy statements into syntax tree 110 to create an updated syntax tree. Copy statement builder 108 returns a syntax tree 116 of a side effect-free program without affecting the decision logic of the original program in any way other than the inserted copy statements. In different embodiments, copy statement builder 108 employs different copying strategies which differ in the parts of the syntax tree that are modified with the inserted copy statements and in the number of copy statements that are inserted.

The functionality of the components shown in FIG. 1 is described in more detail in the discussion of FIG. 2, FIG. 3, FIG. 4, FIGS. 5A-5B, and FIG. 11 presented below.

Process for Completing a Decision Logic to Avoid Side Effects

Figure 2:
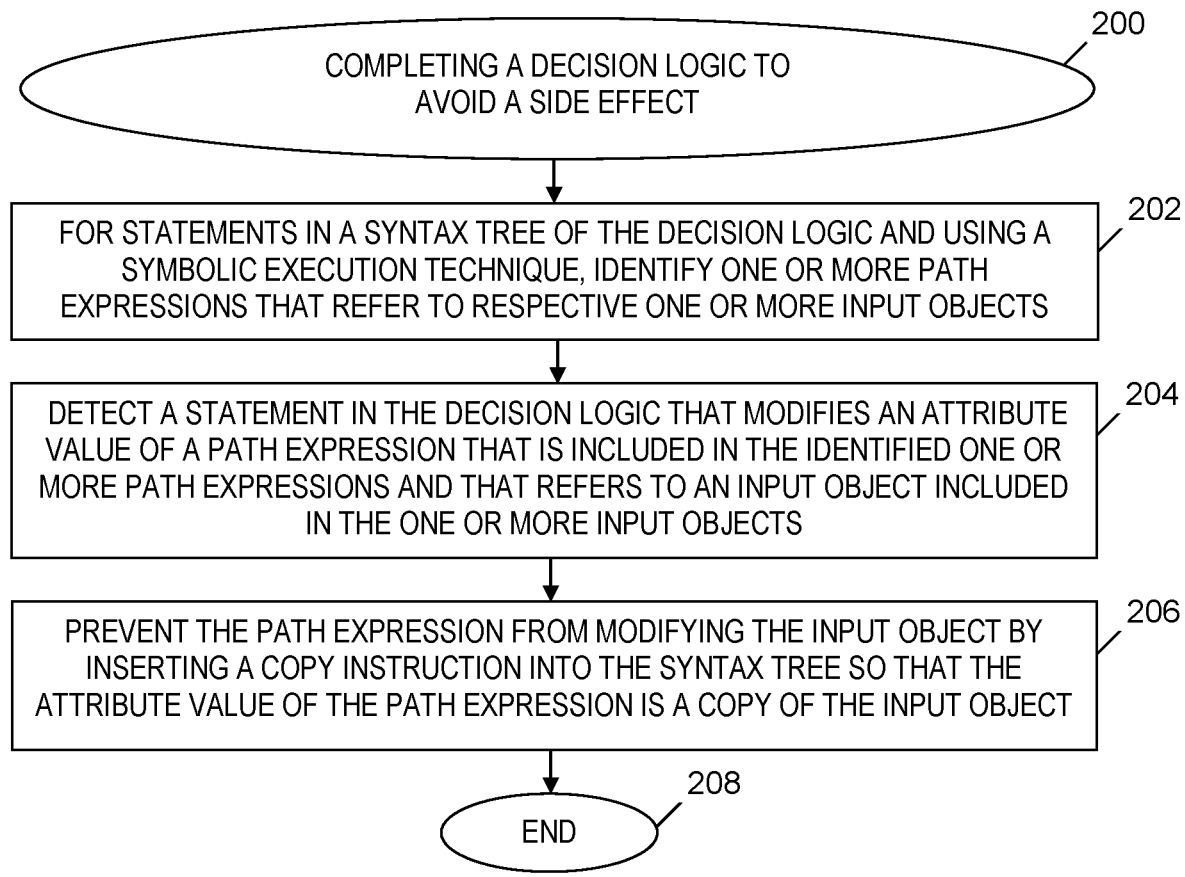
FIG. 2 is a flowchart of a process of completing a decision logic to avoid side effects, where the process is implemented in the system of FIG. 1, in accordance with embodiments of the present invention.

FIG. 2 is a flowchart of a process of completing a decision logic to avoid side effects, where the process is implemented in the system of FIG. 1, in accordance with embodiments of the present invention. The process of FIG. 2 starts at step 200. In step 202, for statements in syntax tree 110 (see FIG. 1) of the decision logic and using a symbolic execution technique, decision logic completion system 104 (see FIG. 1) identifies one or more path expressions that refer to respective one or more input objects. In one embodiment, input modification analyzer 106 (see FIG. 1) performs step 202.

In step 204, decision logic completion system 104 (see FIG. 1) detects a statement in the decision logic that modifies an attribute value of a path expression that is included in the one or more path expressions identified in step 202 and that refers to an input object included in the aforementioned one or more input objects. In response to detecting the statement that modifies the attribute value of the path expression, decision logic completion system 104 (see FIG. 1) creates a copy request that indicates the statement that caused the input reference together with the statement that leads to the side effect. In one embodiment, input modification analyzer 106 (see FIG. 1) performs step 204 and sends the copy request to copy statement builder 108 (see FIG. 1).

In step 206, decision logic completion system 104 (see FIG. 1) prevents the aforementioned path expression from modifying the input object by inserting a copy instruction into the syntax tree as indicated by the copy request and according to a predetermined copying policy so that the attribute value of the path expression is a copy of the input object. Inserting the copy instruction creates an updated syntax tree of the program.

In one embodiment, the copying policy indicates that the insertion of the copy instruction is placed in the syntax tree so that the copying is performed as early as possible in a sequence of statements that cause the path expression to be a frozen path expression. Frozen path expressions are discussed below. In an alternate embodiment, the copying policy indicates that the insertion of the copy instruction is placed in the syntax tree so that the copying is performed immediately prior to the point at which the program would have exerted the side effect had the copying not been performed.

The process of FIG. 2 ends at step 208.

In one embodiment, steps 202, 204 and 206 are repeated so that decision logic completion system 104 (see FIG. 1) inserts multiple copy instructions into syntax tree 110 (see FIG. 1) to create syntax tree 116 (see FIG. 1), and decision logic completion system 104 (see FIG. 1) determines or receives a completed decision logic that is based on syntax tree 116, where the completed decision logic specifies a side effect-free program. Prior to the decision logic being completed, the decision logic specified a program that caused one or more side effects.

Figure 3:
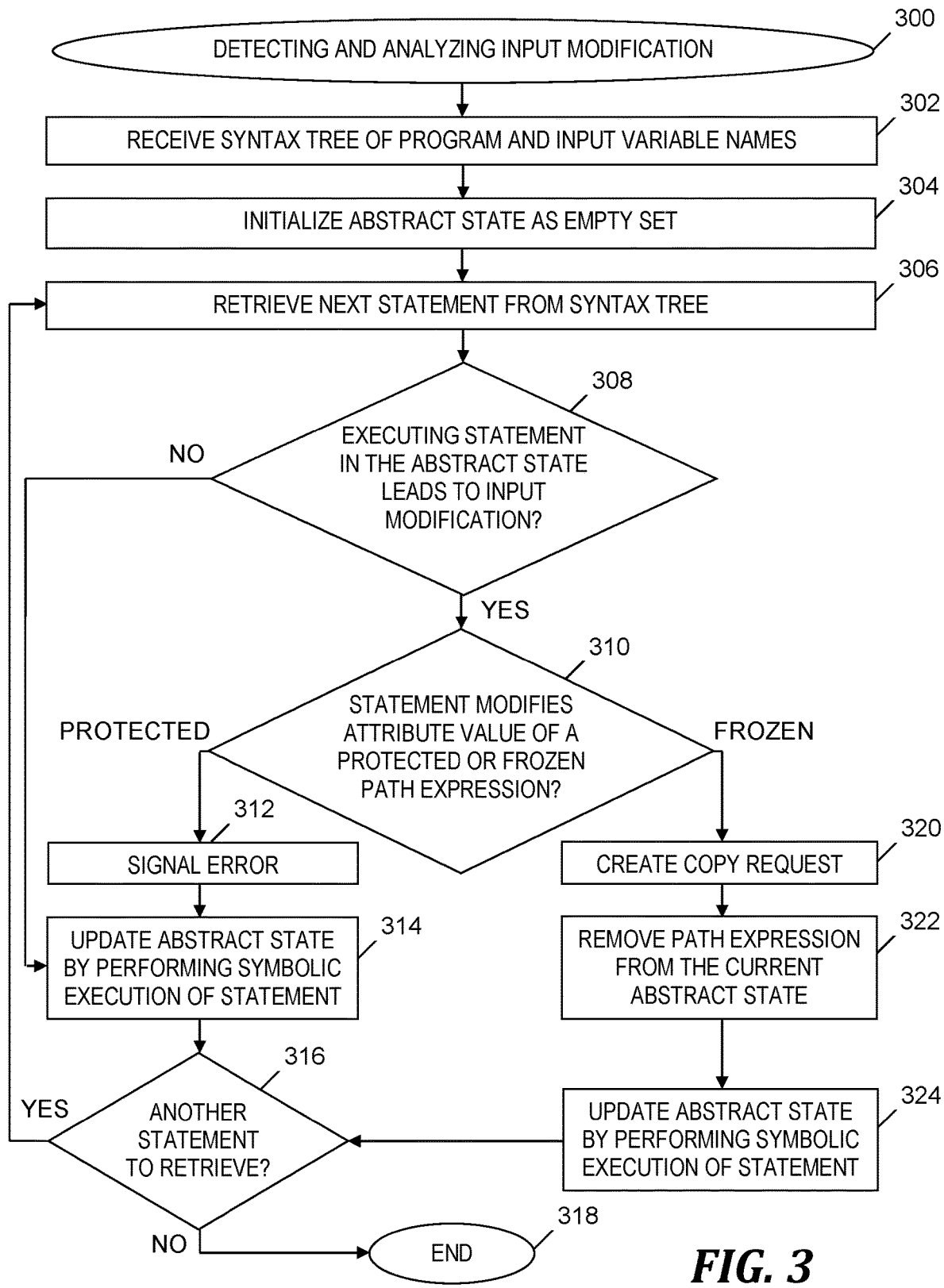
FIG. 3 is a flowchart of a process of detecting and analyzing input object modification, where the process is included in the process of FIG. 2 and performed by a component of the system of FIG. 1, in accordance with embodiments of the present invention.

In one embodiment, steps 202 and 204 collectively include the process of FIG. 3. In one embodiment, step 206 includes the process of FIG. 4.

Detecting and Analyzing Input Modification

FIG. 3 is a flowchart of a process of detecting and analyzing input object modification, where the process is included in the process of FIG. 2 and performed by input modification analyzer 106 in FIG. 1, in accordance with embodiments of the present invention. The process of FIG. 3 starts at step 300. In step 302, input modification analyzer 106 (see FIG. 1) receives syntax tree 110 (see FIG. 1) and names of input variables 112 (see FIG. 1).

In step 304, input modification analyzer 106 (see FIG. 1) initializes an abstract state as an empty set because there are no frozen path expressions in the initial abstract state.

In step 306, input modification analyzer 106 (see FIG. 1) retrieves the first statement from syntax tree 110 (see FIG. 1). In subsequent performances of step 306, input modification analyzer 106 (see FIG. 1) retrieves the next statement from syntax tree 110 (see FIG. 1).

In step 308, input modification analyzer 106 (see FIG. 1) determines whether executing the retrieved statement in the abstract state leads to input modification. As used in the discussion of FIG. 3, "retrieved statement" is the statement (i.e., first statement or next statement from syntax tree 110 (see FIG. 1)) retrieved in the most recent performance of step 306. If input modification analyzer 106 (see FIG. 1) determines in step 308 that executing the retrieved statement in the abstract state leads to input modification, then the Yes branch of step 308 is followed and step 310 is performed.

In step 310, input modification analyzer 106 (see FIG. 1) determines whether the retrieved statement modifies an attribute value of a protected path expression or a frozen path expression. The section entitled Non-modifiable path expression, presented below, includes the meaning of the terms "protected path expression" and "frozen path expression," as used herein. If input modification analyzer 106 (see FIG. 1) in step 310 determines that the retrieved statement modifies an attribute value of a protected path expression, then the Protected branch of step 310 is followed and step 312 is performed.

In step 312, input modification analyzer 106 (see FIG. 1) signals an error.

In step 314, input modification analyzer 106 (see FIG. 1) updates the abstract state by performing a symbolic execution of the retrieved statement.

In step 316, input modification analyzer 106 (see FIG. 1) determines whether there is another statement in syntax tree 110 (see FIG. 1) to retrieve. If input modification analyzer 106 (see FIG. 1) determines in step 316 that there is another statement to retrieve from syntax tree 110 (see FIG. 1), then the Yes branch of step 316 is followed and the process of FIG. 3 loops back to step 306 to retrieve the next statement from syntax tree 110 (see FIG. 1). This loop back to step 306 allows a portion of the process of FIG. 3 to be repeated until input modification analyzer 106 (see FIG. 1) checks all statements of syntax tree 110 (see FIG. 1) for input modifications and executes the statements with the symbolic execution technique after the check. If input modification analyzer 106 (see FIG. 1) detects an error, then input modification analyzer 106 (see FIG. 1) signals the error in step 312. Otherwise, input modification analyzer 106 (see FIG. 1) creates the copy requests and sends the copy requests to copy statement builder 108 (see FIG. 1).

If input modification analyzer 106 (see FIG. 1) determines in step 316 that there is not another statement to retrieve from syntax tree 110 (see FIG. 1), then the No branch of step 316 is followed and the process of FIG. 3 ends at step 318.

Returning to step 310, if input modification analyzer 106 (see FIG. 1) determines that the retrieved statement modifies an attribute value of a frozen path expression, then the Frozen branch of step 310 is followed and step 320 is performed.

In step 320, input modification analyzer 106 (see FIG. 1) creates a copy request that includes the statement that leads to a side effect. In step 322, input modification analyzer 106 (see FIG. 1) supposes that the path expression is no longer frozen and therefore removes the path expression from the current abstract state before executing the statement in step 324. Input modification analyzer 106 (see FIG. 1) performs step 322 under the assumption that the path expression is no longer frozen since in the completed decision logic, the path expression no longer refers to an input object. In step 324, input modification analyzer 106 (see FIG. 1) updates the abstract state by performing a symbolic execution of the retrieved statement.

Following step 324, input modification analyzer 106 (see FIG. 1) determines in step 316 whether there is another statement to retrieve from syntax tree 110 (see FIG. 1), as described above.

Returning to step 308, if input modification analyzer 106 (see FIG. 1) determines that executing the retrieved statement in the abstract state does not lead to an input modification, then the No branch of step 308 is followed and the process of FIG. 3 continues with step 314, as described above.

In one embodiment, the copy request created in step 320 includes the statements that cause a path expression to be frozen and input modification analyzer 106 (see FIG. 1) maintains additional information in the abstract state which includes the sequence of statements that causes the path expression to be frozen. In response to input modification analyzer 106 (see FIG. 1) utilizing the symbolic execution technique to execute one of the statements, input modification analyzer 106 (see FIG. 1) updates the history maintained as the aforementioned sequence of statements. For example, in response to input modification analyzer 106 (see FIG. 1) executing an assignment statement, input modification analyzer 106 (see FIG. 1) computes a new history for the left-hand side of the assignment statement. If the right-hand side of the assignment statement is frozen, then input modification analyzer 106 (see FIG. 1) determines the history of the left-hand side to be the history of the right-hand side combined with the assignment statement. If the right-hand side of the assignment statement is not frozen, then input modification analyzer 106 (see FIG. 1) determines that the history of the left-hand side of the assignment statement is empty.

If the retrieved statement is an if-then-else conditional statement, input modification analyzer 106 (see FIG. 1) stores the current abstract state on a stack of abstract states and subsequently executes the "then" branch of the conditional statement. In response to the "then" branch being completely executed, input modification analyzer 106 (see FIG. 1) exchanges the last abstract state on the stack with the current abstract state in order to preserve the result from executing the "then" branch and to start the execution of the "else" branch from the same state as that of the "then" branch. In response to the "else" branch being executed, input modification analyzer 106 (see FIG. 1) combines the current abstract state with the last abstract state in the stack (e.g., by taking the set union of the current and last abstract states).

Building Copy Statements

Figure 4:
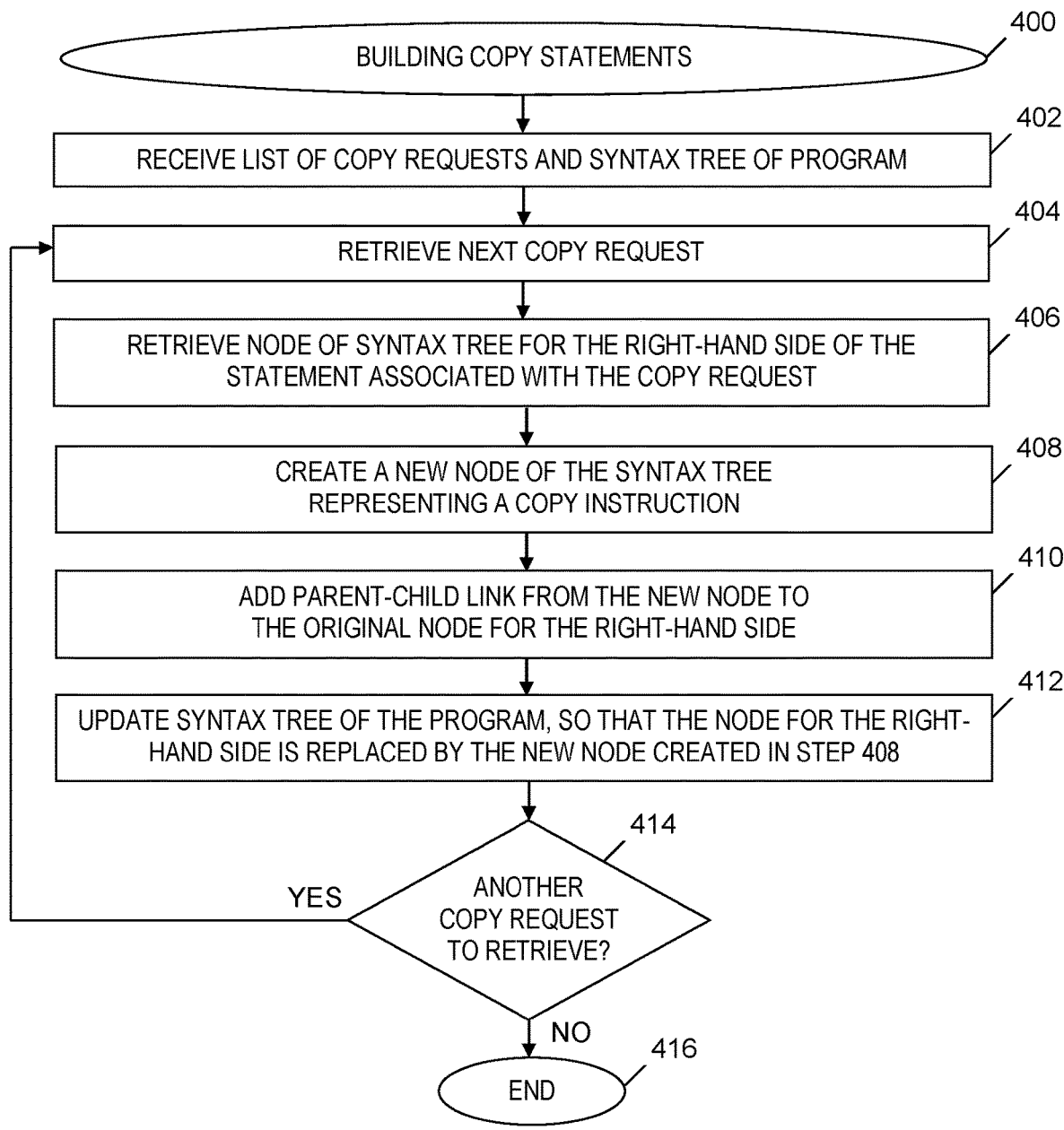
FIG. 4 is a flowchart of a process of building copy statements, where the process is included in the process of FIG. 2 and performed by a component of the system of FIG. 1, in accordance with embodiments of the present invention.

FIG. 4 is a flowchart of a process of building copy statements, where the process is included in the process of FIG. 2 and performed by copy statement builder 108 in FIG. 1, in accordance with embodiments of the present invention. The process of FIG. 4 starts at step 400. In step 402, copy statement builder 108 (see FIG. 1) receives list of copy requests 114 (see FIG. 1) and syntax tree 110 (see FIG. 1) of the program.

In step 404, copy statement builder 108 (see FIG. 1) retrieves the first or next copy request from list of copy requests 114 (see FIG. 1). If step 404 is being performed for the first time, then copy statement builder 108 (see FIG. 1) retrieves the first copy request; otherwise, in subsequent performances of step 404, copy statement builder 108 (see FIG. 1) retrieves the next copy request in list of copy requests 114 (see FIG. 1). Hereinafter in the discussion of FIG. 4, the copy request retrieved in the most recent performance of step 404 is referred to as the retrieved copy request.

After step 404 and prior to step 406, copy statement builder 108 (see FIG. 1) inspects the history included in the copy request and selects one of the statements in the history according to a copying policy. The selected statement is an assignment statement or an adder statement because these statements can lead to frozen path expressions, but other types of statements such as clearer statements and remover statements cannot lead to frozen path expressions.

In one embodiment, in accordance with the copying policy, copy statement builder 108 (see FIG. 1) selects the first statement from the history so that the copying is done as early as possible. In another embodiment, in accordance with a different copying policy, copy statement builder 108 (see FIG. 1) selects the statement causing the side effect, thereby copying as late as possible.

If multiple statements modify the same object, copying as early as possible advantageously copies the object only once, while copying as late as possible copies the object multiple times. For a program that tests whether two path expressions have the same object as a value, however, copying as early as possible has a drawback. Copying as early as possible impacts tests that occur between the first statement in the history and the last statement in the history, whereas copying as late as possible impacts only tests succeeding the last statement. Therefore, in this case, copying as early as possible impacts a larger part of the decision logic as compared to copying as late as possible.

To avoid the left-hand side of the selected statement becoming frozen, the right-hand side of the selected statement needs to be copied. In step 406, copy statement builder 108 (see FIG. 1) retrieves a node of the current version of syntax tree 110 (see FIG. 1) for the right-hand side of the selected statement (i.e., identifies a node in the current syntax tree that needs to be copied).

In step 408, copy statement builder 108 (see FIG. 1) creates a new node in the current version of syntax tree 110 (see FIG. 1), where the new node represents a copy instruction.

In step 410, copy statement builder 108 (see FIG. 1) adds a parent-child link from the new node created in step 408 to the original node in the current version of syntax tree 110 (see FIG. 1) for the right-hand side of the statement.

In step 412, copy statement builder 108 (see FIG. 1) updates the current version of syntax tree 110 (see FIG. 1) to create a new current version of syntax tree 110 (see FIG. 1), so that the node for the right-hand side of the statement is replaced by the new node created in step 408.

In step 414, copy statement builder 108 (see FIG. 1) determines whether there is another copy request to retrieve from list of copy requests 114 (see FIG. 1). If copy statement builder 108 (see FIG. 1) determines in step 414 that there is another copy request to retrieve from list of copy requests 114 (see FIG. 1), then the Yes branch of step 414 is followed and the process of FIG. 4 loops back to step 404 to retrieve the next copy request, and use the next copy request to create and insert a new node into the previously updated version of syntax tree 110 (see FIG. 1), where the new node represents a copy instruction corresponding to the next copy request, and where inserting the new node updates the previously updated version of syntax tree 110 (see FIG. 1). This loop is repeated until copy statement builder 108 (see FIG. 1) processes all copy requests in list of copy requests 114 (see FIG. 1).

If copy statement builder 108 (see FIG. 1) determines in step 414 that there is not another copy request to retrieve from list of copy requests 114 (see FIG. 1), then the No branch of step 414 is followed and the process of FIG. 4 ends at step 416.

Syntax Tree Examples

Figure 5A:
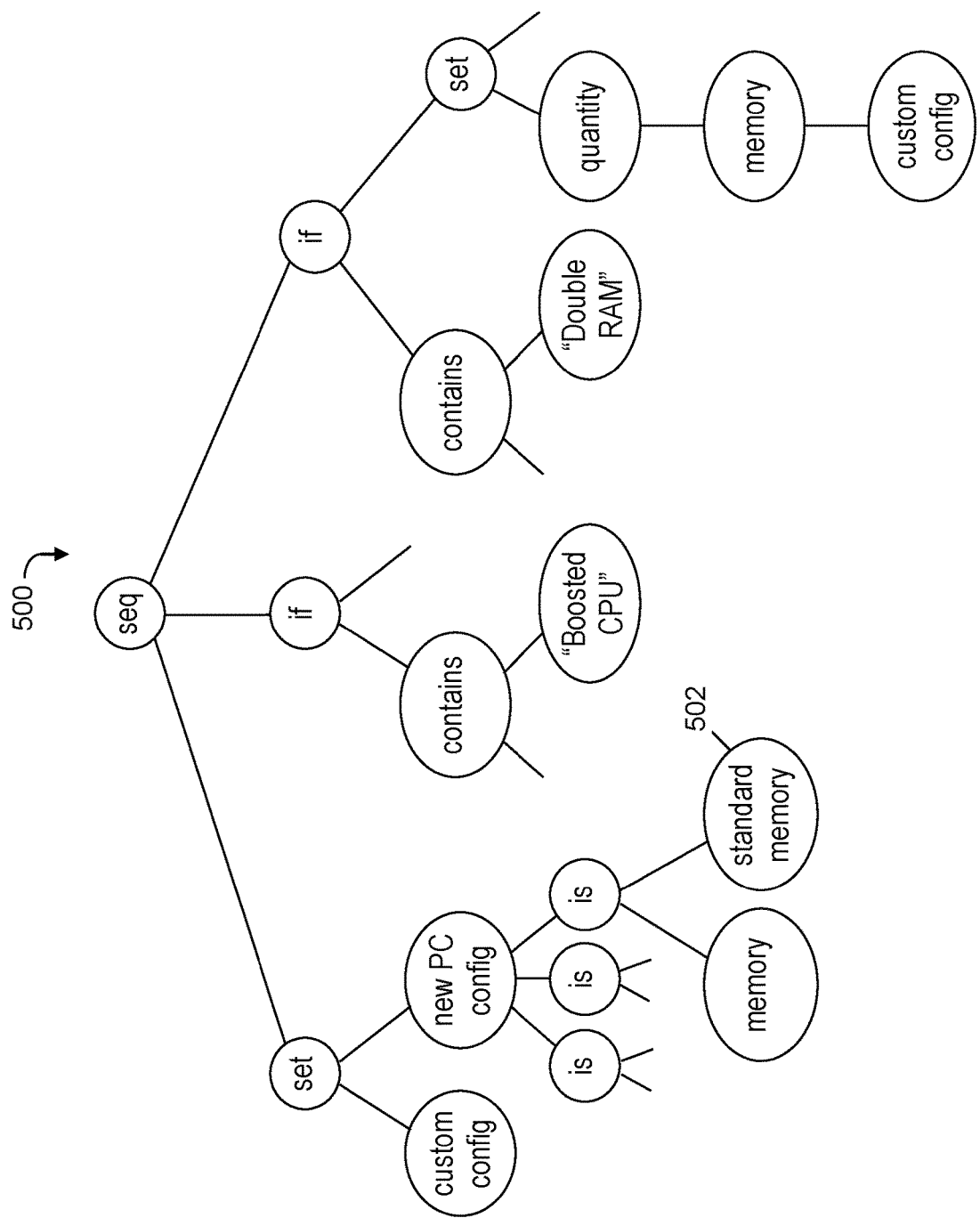
FIG. 5A is an example of a syntax tree of a custom configuration program with side effects, which is an initial syntax tree in the processes of FIG. 2, FIG. 3, and FIG. 4, and is an input to components of the system of FIG. 1, in accordance with embodiments of the present invention.

FIG. 5A is an example of a syntax tree 500 of a custom configuration program with side effects, which is an initial syntax tree in the processes of FIG. 2, FIG. 3, and FIG. 4 and is an input to input modification analyzer 106 (see FIG. 1) and copy statement builder 108 (see FIG. 1), in accordance with embodiments of the present invention. For simplicity and readability, some of the subtrees of syntax tree 500 are not shown. Syntax tree 500 is an example of the syntax tree referenced in step 202 (see FIG. 2), received by input modification analyzer 106 (see FIG. 1) in step 302 (see FIG. 3), and received by copy statement builder 108 (see FIG. 1) in step 402 (see FIG. 4). Standard memory node 502 is an example of a node for the right-hand side of a statement selected from the history in a copy request created in step 320 (see FIG. 3) and retrieved in step 404 (see FIG. 4), where the node is retrieved in step 406 (see FIG. 4) and is replaced by a new node in step 412 (see FIG. 4). The result of the replacement of standard memory node 502 is shown in FIG. 5B.

Figure 5B:
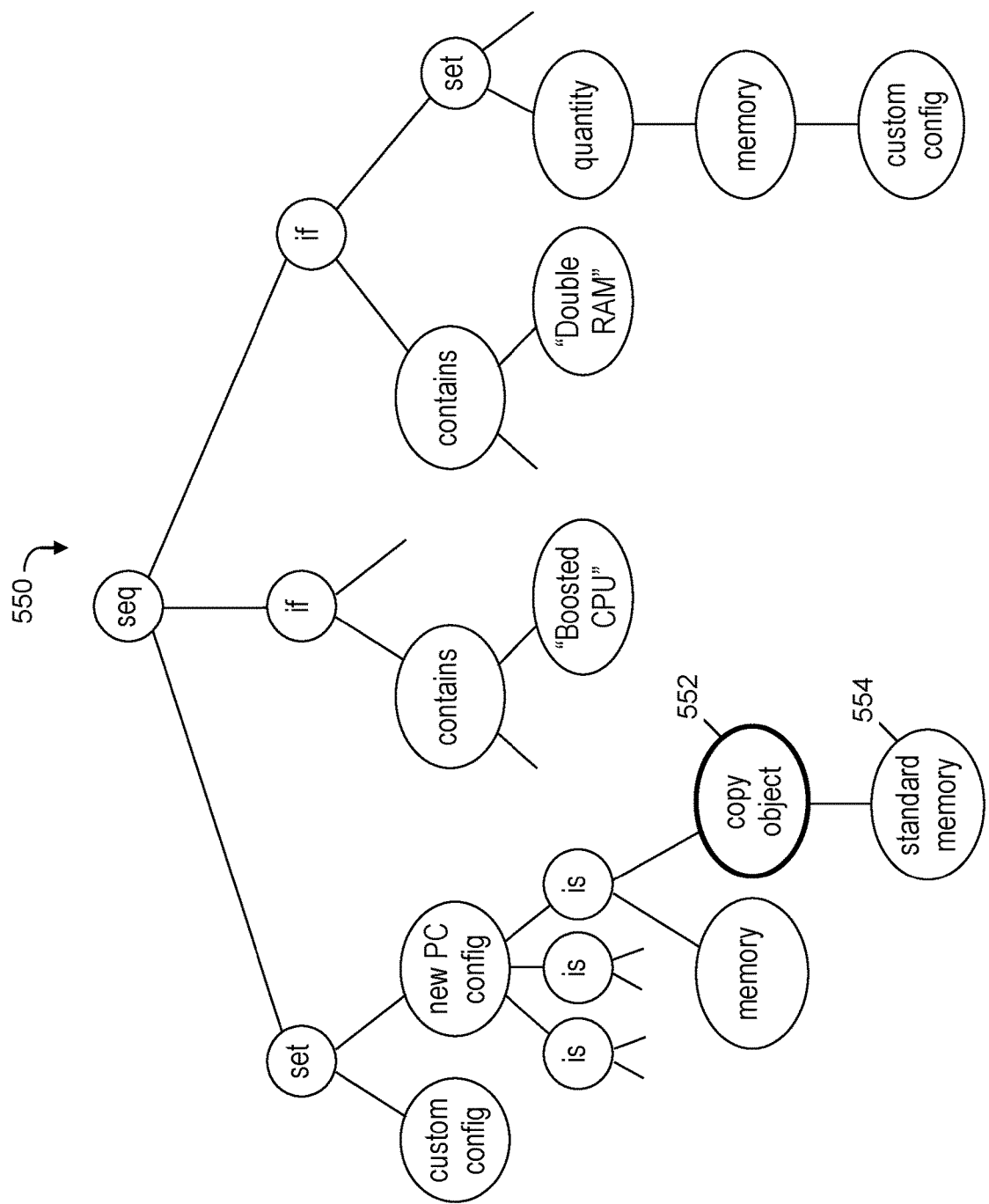
FIG. 5B is an example of a syntax tree of a custom configuration program without side effects, which results from the syntax tree in FIG. 5A being updated by the process of FIG. 4, and which is generated by a component of the system of FIG. 1, in accordance with embodiments of the present invention.

FIG. 5B is an example of a syntax tree 550 of a custom configuration program without side effects, which results from the syntax tree 500 in FIG. 5A being updated by the process of FIG. 4, and which is generated by a copy statement builder 108 (see FIG. 1), in accordance with embodiments of the present invention. For simplicity and readability, some of the subtrees of syntax tree 550 are not shown. Syntax tree 550 is an example of the result of step 412 (see FIG. 4) in which copy statement builder 108 (see FIG. 1) updates syntax tree 500 (see FIG. 5A). The updating in step 412 (see FIG. 4) includes copy statement builder 108 (see FIG. 1) replacing standard memory node 502 (see FIG. 5A) with copy object node 552, which has standard memory node 554 as a child node.

Example of Completing a Decision Logic

Using an example, embodiments of the present invention are explained in this section. In the example, an internet company sells preconfigured personal computers (PCs) via a website, but allows a limited amount of customized configuration. A sales order thus consists of the product number (i.e., product identifier (id)) as well as of a set of options. For example, there may be options for choosing a faster CPU and for choosing twice as much memory. The result of the configuration is a bill-of-material indicating the product number as well as the parts CPU and memory together with their quantities and unit prices.

A customer may be interested in knowing the price surplus of a custom configuration over a standard configuration before issuing a sales order. The website may provide a service comparing the price of a custom configuration with that of a standard configuration.

Figure 6:
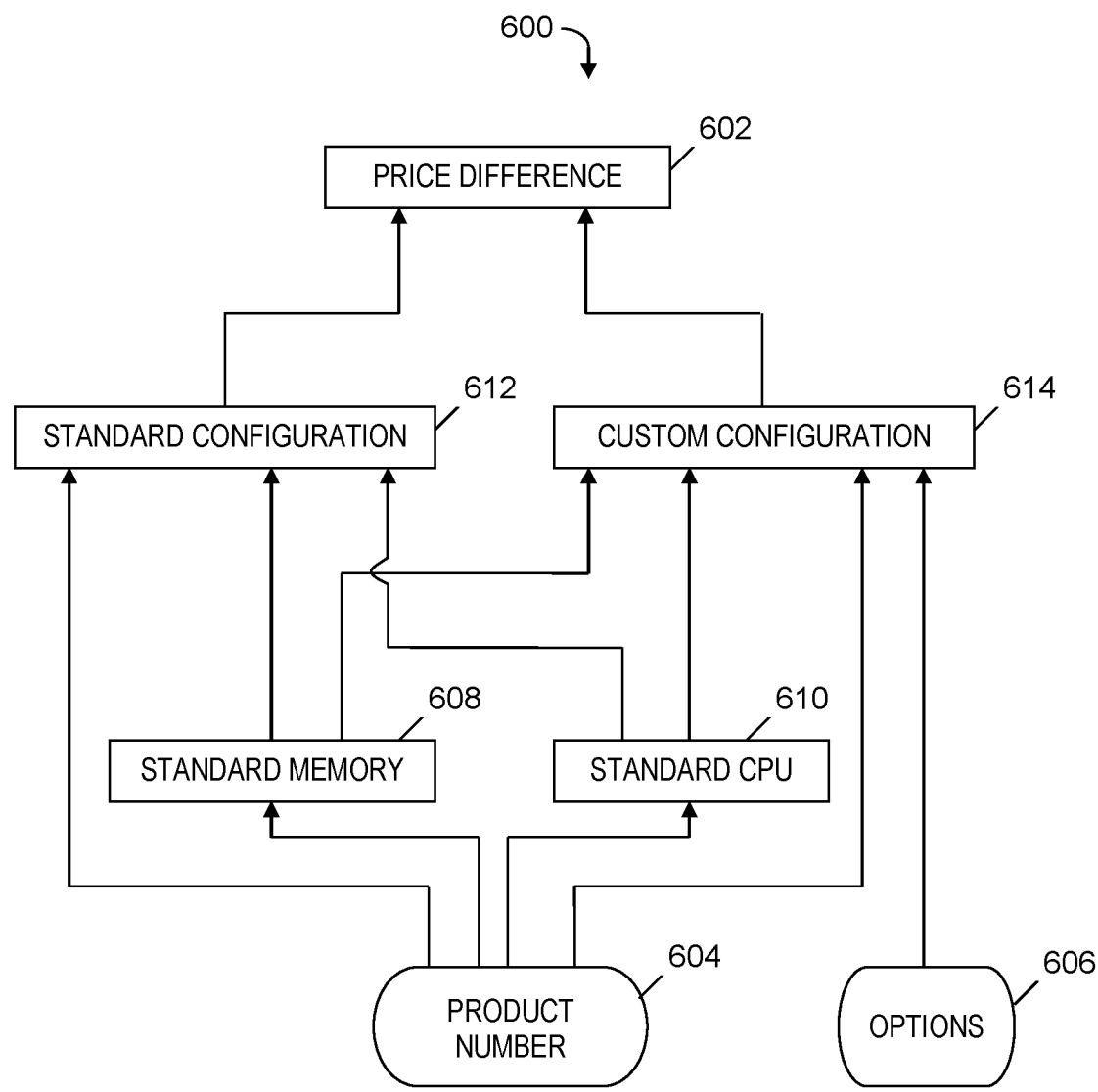
FIG. 6 is an influence diagram of an example of a hierarchical decision policy which defines decision logic that is completed by the process of FIG. 2, in accordance with embodiments of the present invention.

FIG. 6 is an influence diagram 600 of an example of a hierarchical decision policy which defines decision logic that is completed by the processes of FIG. 2, FIG. 3, and FIG. 4, in accordance with embodiments of the present invention. Influence diagram 600 shows different steps of a policy that determines a price difference 602 for a given product number 604 and a given set of options 606:

1. Determine a standard memory component 608 based on the product number 604.
2. Determine the standard CPU component 610 based on the product number 604.
3. Determine the standard configuration 612 based on the standard memory component 608 and the standard CPU component 610.
4. Determine the custom configuration 614 based on the standard memory component 608 and the standard CPU component 610 and modify the custom configuration 614 based on the options 606.
5. Compute the price difference 602 between the custom configuration 614 and the standard configuration 612.

Given the set-up in influence diagram 600, a configuration and pricing expert of the internet company defines the decision logic of each of these steps, e.g., in the form of rules. Hereinafter, in the discussion of the example of completing a decision logic, the configuration and pricing expert is also referred to simply as "the expert."

Decision Logic for Determining the Standard Configuration

The standard memory 608 depends on the chosen product number 604. For each product number 604, the expert provides a rule that creates a part with an adequate part identifier, quantity, and unit price:

if
the product number is "XYZ PC"
then
set 'the standard memory' to a new part where
the id is "ZYX 8 GB RAM",
the quantity is 4,
the unit price is 100;

The expert provides a similar rule for choosing the standard CPU 610:
if
the product number is "XYZ PC"
then
set 'the standard cpu' to a new part where
the id is "YZX p7",
the quantity is 1,
the unit price is 200;
The expert then builds the standard configuration 612 by a simple action that combines elements in the aforementioned rules:
then
set the standard configuration to a new PC configuration where
the product id is the product number,
the cpu is the standard cpu,
the memory is the standard memory;
Decision logic for determining the custom configuration
The custom configuration 614 is initialized in a similar way and then is adapted by a custom rule for each option. The initialization of the custom configuration 614 is achieved by rule r0:
then
set the custom configuration to a new PC configuration where
the product id is the product number,
the cpu is the standard cpu,
the memory is the standard memory;
If the option named "Boosted CPU" is among the given set of options 606, then another CPU with a different unit price is used and all other elements of the custom configuration do not change, as indicated in rule r1 presented below:
if
the options contain "Boosted CPU"
then
set the custom configuration to a new PC configuration where
the product id is the product id of the custom configuration,
the cpu is a new part where
the id is "YZX p9",
the quantity is the quantity of the cpu of the custom configuration,
the unit price is 400,
the memory is the memory of the custom configuration;
The action of rule r1 creates a new configuration object and initializes its attributes to the new values where this is possible. All other attributes of the new configuration object are initialized in rule r1 by the respective values of the previous configuration object. The latter step is tedious and it would be preferable to only modify the relevant attributes as is done in rule r1b presented below:
if
the options contain "Boosted CPU"
then
set the id of the cpu of the custom configuration to "YZX p9";
set the unit price of the cpu of the custom configuration to 400;
Rule r1b contains only actions that are relevant from the point of view of configuration and no technical actions such as copying attribute values. In one embodiment, rule r1b, however, has undesirable side effects according to the standard semantics of assignment statements. These side effects are not apparent in the formulation of the rule, but are caused by several statements:

1. After executing the rule r0 for initializing the custom configuration 614, the cpu attribute of the custom configuration object has a value which is the given standard cpu object.
2. The action of setting the id of the cpu of the custom configuration 614 to "YZX p9" retrieves the object that is the value of the cpu attribute of the custom configuration object. The action then modifies the value of the id attribute of the retrieved object. However, this retrieved object is the standard cpu object, which is given as input. Hence, the action modifies an input object and may thus cause side effects in other steps of the considered decision policy.

Embodiments of the present invention detect those potential side effects and add adequate copy statements to avoid them.

If the option named "Double RAM" is among the given set of options 606, then the memory is doubled by multiplying the quantity of the memory of the custom configuration 614 by the factor two, as indicated by rule r2 presented below:
if
the options contain "Double RAM"
then
set the quantity of the memory of the custom configuration to
2*the quantity of the memory of the custom configuration
Again, rule r2 causes side effects because the memory of the custom configuration 614 is initially equal to the standard memory object after the execution of rule r0, the action of doubling the memory retrieves the object that is the value of the memory of the custom configuration object. The action then modifies the value of the quantity attribute of the retrieved object, which is the standard memory object. The action therefore modifies an input object which causes the side effects in other steps of the decision policy.

Hereinafter, rules r0, r1, and r2 are used to illustrate certain aspects of embodiments of the present invention, including the capability to distinguish rules without side effects from other rules that have side effects.

Decision Logic for Comparing Both Configurations

Computing the price difference is the last step of the example decision policy. The expert adds a first rule that adds the price difference by a fixed price surplus of the custom configuration over the standard configuration. Furthermore, there is a rule computing a price surplus for each component. For example, the following rule computes the price surplus for the CPU and adds it to the price difference.
if
the cpu of the custom configuration is not
the cpu of the standard configuration
then
set the price difference to the price difference+
the quantity of the cpu of the custom configuration*
the unit price of the cpu of the custom configuration−
the quantity of the cpu of the standard configuration*
the unit price of the cpu of the standard configuration;
If the cpu attributes of the custom configuration 614 and the standard configuration 612 have the object as unit price value, then the price surplus for the cpu is zero. In the case in which the price surplus for the cpu is zero, the rule action does not alter the price difference and applying the rule leads to the same result as not applying it. As such, the rule condition is not needed from a logical point of view. However, if rule executions are traced, then it can be discovered in the traces whether the rule has been applied or not. If the rule has not been applied, then the cpu attributes of the custom configuration 614 and the standard configuration 612 have the same object as value, meaning that the cpu object has not been copied. Otherwise, the cpu object has necessarily been copied. Hence, it is discoverable whether a copying has occurred or not.

Prerequisites about Decision Logic Language

Embodiments of the present invention involve methods and systems for analyzing object-oriented programs formulated in a suitable programming language which has variables and expressions for manipulating objects. Each object has a type and one or more attributes depending on its type. The variables and the attributes of the objects have values that depend on the given state and that can be changed by assignment statements. In one embodiment, these values are primitive values or objects. The programming language has expressions for accessing the values of variables as well as that of object attributes. Furthermore, the programming language has expressions for constructing new objects and conditional statements for expressing rules. In one embodiment, the programming language has more complicated expressions and statements such as while-loops and recursive function calls, but they are not essential for embodiments of the invention. The processes described herein can be adapted to address the more complicated expressions and statements.

Decision logic completion system 104 (see FIG. 1) analyzes the abstract syntax tree (AST) of the considered program. Syntax tree 500 (see FIG. 5A) is the AST for the custom configuration program consisting of the rules r0, r1, and r2.

Path Expressions

In one or more embodiments, decision logic completion system 104 (see FIG. 1) analyzes programming language expressions referring to objects. Although some programming languages have expressions to reference specific objects (via an identifier), this characteristic is not supposed by embodiments of the present invention. However, according to the assumptions given above, the programming language has expressions for accessing objects via a sequence of attributes that are applied to a variable. Objects are thus characterized by path expressions where each path expression consists of a list of attributes and a variable name. An example is the path expression "the memory of the custom configuration." In one or more embodiments, a pre-fix notation is used and it is assumed that the first attribute in the list is the one that is applied last.

FIG. 7 depicts examples 700 of path expressions and operations on path expressions used in the processes of FIG. 2 and FIG. 3, in accordance with embodiments of the present invention. Examples 700 of path expressions shows their textual form as well as their internal representation in form of a graph, which is used by decision logic completion system 104 (see FIG. 1).

Decision logic completion system 104 (see FIG. 1) extracts path expressions from the AST (i.e., syntax tree 110 in FIG. 1) and analyzes the extracted path expressions. For the extraction and analysis of path expressions, decision logic completion system 104 (see FIG. 1) uses one or more operations on path expressions, which are selected from the list presented below:

Test whether a path expression is empty, i.e., determine whether the path expression consists of a variable, but no attribute. For example, the first path expression in examples 700 (i.e., "the custom config") is an empty path expression, whereas the other path expressions in examples 700 are not empty.

Retrieve the outermost (or first) attribute of a path expression (i.e. the last attribute that is applied). For example, the outermost attribute of the path expression "the memory of the custom configuration" is the attribute "memory".

Compute the reduction of a non-empty path expression. The reduction has the same variable as the given path expression and has all of the given path expression's attributes except for the first attribute. The reduction is obtained from the given path expression by removing the outermost attribute from the path. For example, the third path expression in examples 700 (i.e., "the memory of the custom config") is the reduction of the second path expression in examples 700 (i.e., "the quantity of the memory of the custom config").

Determine whether a path expression can be reduced to another one by none, one, or more than one reduction operations. For example the third path expression in examples 700 (i.e., "the memory of the custom config") can be reduced to the first path expression in examples 700 (i.e., "the custom config").

Substitute a sub-expression of a path expression by another sub-expression. For example, the fourth path expression in examples 700 (i.e., "the memory x") is the result of substituting the sub-expression "the custom configuration" in the third path expression "the memory of the custom configuration" by the path expression "x".

The values of variables and values of object attributes depend on the state. Consequently, the values of path expressions depend on the state.

Non-Modifiable Path Expression

In order to detect side effects, decision logic completion system 104 (see FIG. 1) determines whether an assignment action modifies the value of a path expression that must not be modified. Because the value of a path expression can change from state to state, the same path expression may reference different objects in different states. Path expressions that have an input variable, however, should not change their values and are called protected path expressions.

If an assignment statement modifies an attribute of a protected path expression, then this modification leads to a side effect and is treated as an error. An assignment statement can also modify the attribute of a non-protected path expression, which is allowed except if the value of the non-protected path expression is equal to that of a protected path expression. In the latter case, the aforementioned assignment statement modifies the value of a protected path expression which constitutes a side effect.

Decision logic completion system 104 (see FIG. 1) therefore detects whether the value of a non-protected path expression is equal to the value of a protected path expression in a given state. If yes, such a non-protected path expression is called a frozen path expression of the state. The term "frozen" indicates that assignment statements must not modify the attributes of such a path expression.

In the initial state, it is assumed that the non-protected path expressions are undefined and therefore the non-protected path expressions cannot have a value equal to a protected path expression. As a consequence, there is no frozen path expression in the initial state.

Basic Structure: Abstract State

One or more embodiments use ideas from abstract interpretation in order to compute frozen path expressions for any input to the program. It will not be possible to execute the program for each possible input to the program and to check whether such an execution leads to a side effect. The reason is that the number of possible inputs to the program is much too large. An abstract interpretation does not distinguish the different inputs and performs a single abstract execution that is valid for all of them. This abstract interpretation technique for program analysis has been introduced in the article "Abstract Interpretation: A Unified Lattice Model for Static Analysis of Programs by Construction or Approximation of Fixpoints." by Cousot & Cousot published in the Conference Record of the Fourth ACM Symposium on Principles of Programming Languages in 1977, pages 238-252. In this context, the term "abstract" means that concrete states are transformed into abstract states that contain less detail, but are still sufficient to identify certain issues in a program.

Decision logic completion system 104 (see FIG. 1) tailors the abstract interpretation technique to the task of finding frozen path expressions, thus leading to concrete data structures and operations for doing such an "abstract" interpretation.

Each state is mapped to an abstract state that consists of the set of frozen path expressions. These abstract states constitute the central data structure of input modification analyzer 106 (see FIG. 1) which performs the steps in the process of FIG. 3.

Whereas a standard language processor of the given program executes the statements of the program on concrete states with the purpose of producing a result, the input modification analyzer 106 (see FIG. 1) executes the same statements on abstract states with the purpose of finding side effects. The relationships between both executions can be understood as follows: When executing a statement of the program, the execution modifies the current state, thereby mapping the current state to a successor state and defining a state transition function. The state transition function induces an abstract state transition mapping that is defined as follows:

consider a state S1 consider the state S2 resulting from applying the state transition function to Si consider the abstract state AS1 which consists of the path expressions that are frozen in state S1 consider the abstract state AS2 which consists of the path expressions that are frozen in state S2

Figure 8:
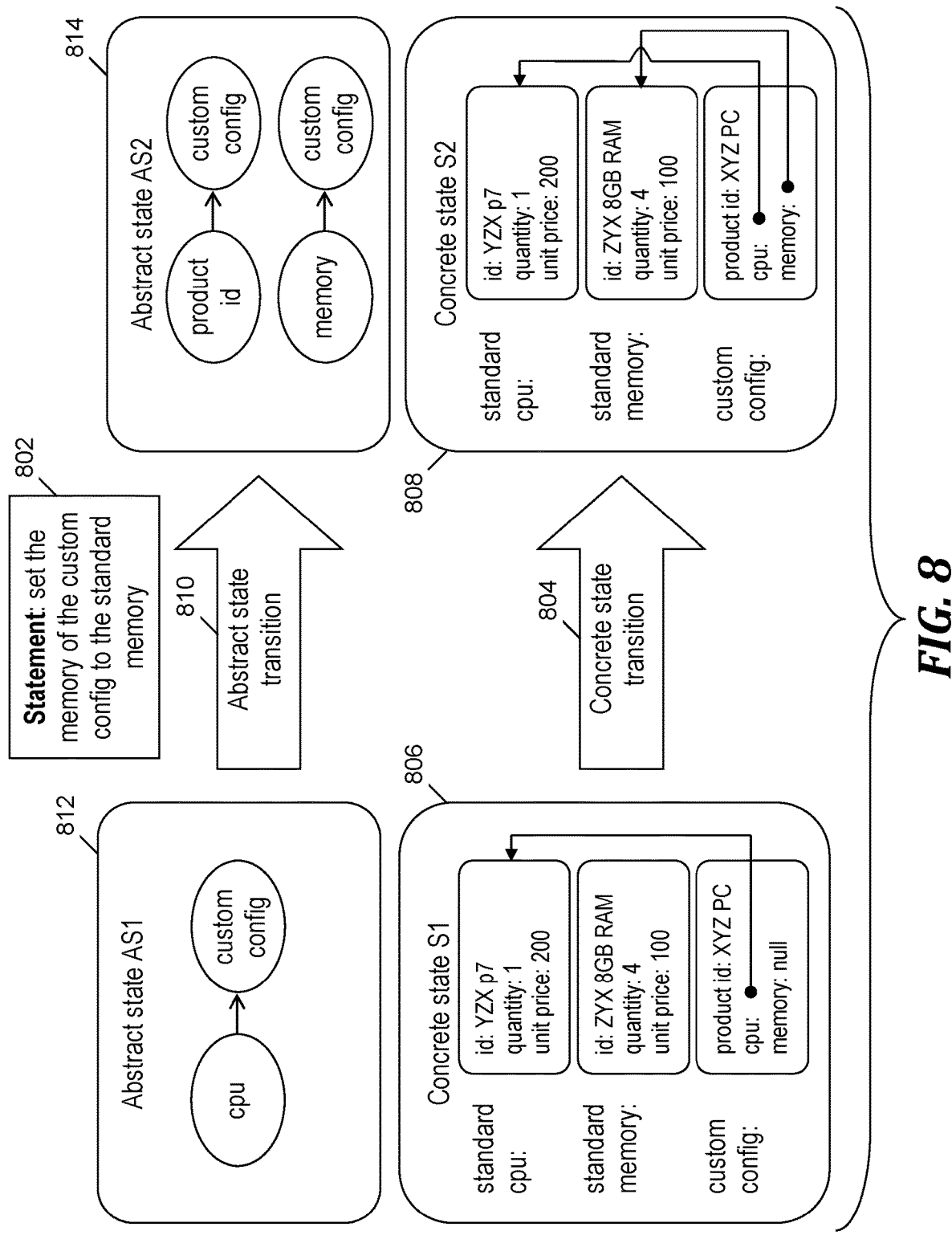
FIG. 8 depicts abstract state and concrete state transition mappings for an example of a statement, in accordance with embodiments of the present invention.

The abstract state transition mapping maps AS1 to AS2. FIG. 8 depicts abstract state and concrete state transition mappings for an example of a statement, in accordance with embodiments of the present invention. The example in FIG. 8 illustrates the execution of a statement 802 (i.e., "set the memory of the custom configuration to the standard memory") on concrete states (as done by a standard language processor) and on abstract states (as done by the input modification analyzer 106 in FIG. 1). Whereas the execution of statement 802 using a concrete state transition mapping 804 to map a first concrete state 806 (i.e., state S1) to a second concrete state 808 (i.e., state S2) sets the value of the memory attribute of the custom configuration to the value of the standard memory, the execution using an abstract state transition mapping 810 to map a first abstract state 812 (i.e., state AS1) to a second abstract state 814 (i.e., state AS2) adds the path expression "the memory of the custom configuration" to the abstract state as this added path expression refers to an input variable and the value of this input variable must not be modified.

The abstract state transition mapping may not be unique and the same abstract state AS1 may be mapped to multiple abstract states resulting from different concrete executions. As the purpose of the abstract interpretation is to find frozen path expressions that arise according to a concrete execution, it is possible to combine those multiple abstract states into a single, combined abstract state. A path expression is frozen in this combined state if it is frozen in some of the multiple abstract states. Hence, the combination consists of the set union of the frozen statements of all the multiple states. Note that this combination of multiple abstract states can lead to some false positives when detecting side effects, but this approach advantageously avoids false negatives.

Basic Processing Step: Abstract State Transition

The input modification analyzer 106 (see FIG. 1) is required to be able to execute each statement of the decision logic language by using abstract states. The execution of these statements is described in detail below.

Assignment statements consists of a left-hand side and a right-hand side. The left-hand side is a path expression and the value of this path expression is modified in the state S2 resulting from executing the assignment statement. The right-hand side is an expression which may or may not be a path expression:

1. If the right-hand side is not a path expression, then the left-hand-side is not frozen in state S2. Moreover, none of the path expressions that can be reduced to the left-hand side by one or more reduction operations is frozen in state S2. All other path expressions (i.e. those that cannot be reduced to the left-hand-side) do not change their frozen status (i.e., the path expressions are frozen in S2 if and only if they are frozen in state S1).

2. If the right-hand side is a path expression, then the left-hand side is frozen in the state S2 if and only if the right-hand side is a path expression that is protected or frozen in S1. Moreover, if there is a frozen path expression in S1 that can be reduced to the right-hand side by one or more reduction operations, then substituting the right-hand side by the left-hand side yields a further path expression that is frozen in S2. However, if there is a frozen path expression in S1 that can be reduced to the left-hand side by one or more reduction operations and substituting the left-hand side by the right-hand side yields a path expression that is not frozen in S1, then the first path expression is no longer frozen in S2. Note that all other path expressions (i.e., those path expressions that cannot be reduced to the left-hand side) have the same frozen status in S2 as they have in S1.

Given these properties, decision logic completion system 104 (see FIG. 1) can compute the abstract state AS2 from the abstract state AS1.

Some attributes are multi-valued. In one embodiment, the programming language has specific statements for adding a value to a multi-valued attribute, for removing a value from it, or for clearing all values. The aforementioned statements are called adder statement, remover statement, and clearer statement, respectively. All of these statements have a left-hand side which is a path expression where the outermost attribute is multi-valued. The adder statement and remover statement also have a right-hand side which can be a path expression:

The left-hand side of a clearer statement is not frozen in S2.

The left-hand side of an adder statement is frozen in S2 if it is frozen in S1 or if the right-hand side of the adder statement is a path expression and this path expression is protected or frozen in S1.

The left-hand side of a remover statement is frozen in S2 if it is frozen in S1 and the right-hand side of the remover statement is not a path expression that is protected or frozen in S1. Moreover, the left-hand side of a remover statement is not frozen in S2 if it is not frozen in S1. However, if the left-hand side is frozen in S1 and the right-hand side is a path expression that is protected or frozen in S1 then the left-hand side may or may not be frozen in S2.

In this discussion of the adder, remover, and clearer statements, the remover statement is the only statement having an abstract mapping that is not unique. As explained above, a prudent interpretation favors frozen over non-frozen and permits the exclusion of the possibility that the left-hand side becomes non-frozen after the removal.

In one embodiment, the programming language has statements that combine several primitive statements such as the sequence of two statements and conditional statements. When executing a sequence of two statements in a state S1, the first statement will be executed first and map state S1 to a state S2. The second statement will be executed in turn and map state S2 to state S3. Hence, the sequence of the two statement maps state S1 to S3. The state transition function of the sequence thus is the composition of the state transition functions of the two statements. The abstract state transition function of the sequence is the composition of the abstract state transition functions of the two statements. Therefore, decision logic completion system 104 (see FIG. 1) simply performs an abstract execution of the statements in a sequence of statements.

Conditional statements are more cumbersome. A conditional statement consists of a condition, a then-branch, and an else-branch. The then-branch is a statement and the else-branch is a possibly empty statement. The empty statement has a state transition function which is an identity function. Similarly, its abstract state transition function is an identity function and nothing particular needs to be done to handle empty statements with respect to the abstract execution.

When executing the conditional statement in the state S1, first the condition is evaluated in this state. If the condition is true, then the then-branch is executed and maps the state S1 to a state S2a. Otherwise, the else-branch is executed and maps the state S1 to a state S2b. Hence, the conditional statement maps the state S1 to the state S2a if the condition is satisfied in S1 and to the state S2b if the condition is not satisfied. Because the abstract state AS1 obtained from S1 does not contain enough information to permit an evaluation of the condition, the abstract execution cannot discern between the then-branch and the else-branch. Therefore the abstract execution executes both the then-branch and the else-branch, but in parallel and not in sequence, i.e., starting from the same abstract state AS1. The execution of the then-branch will map this abstract state AS1 to an abstract state AS2a and the execution of the then-branch will map the abstract state AS1 to an abstract state AS2b. Both states need then be combined into a common state. As explained above, the prudent approach consists in combining the abstract states AS2a and AS2b into a single one that corresponds to the union of the frozen statements of both abstract states.

In one embodiment, the programming language contains other statements for expressing control flow such as while loops or recursion. The field of abstract interpretation provides methods to properly handle such statements expressing control flow, meaning that the processes disclosed herein can be adapted to those statements if necessary.

Compact Representation of Abstract States

In one embodiment, some decision logics are formulated over objects allowing path expressions of arbitrary length. In this case, abstract states can theoretically contain an infinite number of frozen path expressions and cannot be represented exhaustively. Some embodiments of the invention use a compact representation of abstract states by exploiting the following property of abstract states: If the reduction of a non-empty path expression is frozen in a state and the path expression has a defined value in this state, then the path expression is also frozen in this state. Based on the aforementioned property, it is not necessary to store all frozen path expressions of an abstract state, but only those that are in a core of the abstract state. The core contains all empty path expressions from the abstract state. Furthermore, if a non-empty path expression is in the abstract state, but its reduction is not in the abstract state, then this non-empty path expression is also included in the core. Note that the core may contain additional path expressions from the abstract state, but the embodiments of the present invention work even if these additional path expressions are omitted from the core.

Given the core, decision logic completion system 104 (see FIG. 1) can easily test whether a path expression belongs to the abstract state or not by first checking whether the path expression belongs to the core. If not, decision logic completion system 104 (see FIG. 1) checks whether the reduction of the path expression belongs to the core. If not, decision logic completion system 104 (see FIG. 1) continues the checking with the reduction of the reduction, and so on, until an empty path expression is obtained. If one of these checks succeeds, the path expression belongs to the abstract state. If none of these checks succeeds, the path expression does not belong to the abstract state.

When doing an abstract execution of an assignment statement, decision logic completion system 104 (see FIG. 1) computes a new core based on the previous core. For this purpose, decision logic completion system 104 (see FIG. 1) adds the left-hand side to the new core if this left-hand side is frozen after executing the statement. Moreover, decision logic completion system 104 (see FIG. 1) inspects each path expression of the previous core that can be reduced to the right-hand side, substitutes the right-hand side by the left-hand side, and adds the resulting path expressions to the new core. Decision logic completion system 104 (see FIG. 1) also inspects each path expression of the previous core that can be reduced to the left-hand side, substitutes the left-hand side by the right-hand side, and checks whether the resulting expression is in the previous core. If not, decision logic completion system 104 (see FIG. 1) removes the first path expression from the new core.

Processing of the First Rule of the Custom Configuration Logic

The processing of the input modification analyzer 106 (see FIG. 1) is discussed in this section relative to the decision logic of the custom configuration program. The decision logic is implemented by the three aforementioned rules r0, r1, and r2, which are applied in sequence. The AST of the program is shown as syntax tree 500 (see FIG. 5A). Initially, there is no frozen path expression, meaning that the initial abstract state is the empty set.

The first statement of the program is the following assignment statement in rule r0:

set the custom configuration to a new PC configuration where the product id is the product number, the cpu is the standard cpu, the memory is the standard memory;

This first statement involves a constructor call with initialization clauses and corresponds to four individual assignment statements, which are presented below:

A1: set the custom configuration to a new PC configuration;

A2: set the product id of the custom configuration to the product number;

A3: set the cpu of the custom configuration to the standard cpu;

A4: set the memory of the custom configuration to the standard memory;

Executing this constructor call thus consists of executing the four statements A1, A2, A3, and A4. As the initial abstract state is empty, the first statement A1 cannot modify any frozen path expression, meaning that the input modification analyzer 106 (see FIG. 1) does not create any copy request in response to executing A1. Furthermore, as the right-hand side of A1 is not a path expression, the abstract execution of this statement does not add any frozen path expression. Hence, the abstract state after the abstract execution of A1 is still the empty set.

The second statement A2 modifies the product id of the custom configuration. Again, the abstract execution of A2 cannot lead to any modification of a frozen path expression because the abstract state is empty. The right-hand side of A2 is the variable "the product number," which is a protected path expression. The abstract execution of A2 thus adds the path expression "the product id of the custom configuration" to the frozen path expressions. In some embodiments, the statement A2 is added to the history associated with this path expression. Hence, the abstract state resulting from the abstract execution of A2 is the singleton containing the path expression "the product id of the custom configuration."

The abstract execution of the third statement A3 adds the path expression "the cpu of the custom configuration" to the frozen path expressions. FIG. 9 depicts an example 900 of a trace of abstract execution of statements in the process of FIG. 2, in accordance with embodiments of the present invention. Example 900 shows the abstract state in its fourth line, which depicts the state obtained after executing A3. In some embodiments, the statement A3 is added to the history associated to this path expression.

Similarly, the abstract execution of the fourth statement A4 adds the path expression "the memory of the custom configuration" to the frozen path expressions, as shown in the fifth line of example 900. In some embodiments, the statement A4 is added to the history associated with this path expression. Hence, the abstract state resulting from the execution of rule r0 contains three elements:

the product id of the custom configuration;
the cpu of the custom configuration; and
the memory of the custom configuration Processing of the second rule of the custom configuration logic The next statement of the custom configuration program is rule r1. The input modification analyzer 106 (see FIG. 1) stores the current abstract state on the stack before executing the then-branch. The then-branch consists of the statement:

set the custom configuration to a new PC configuration where the product id is the product id of the custom configuration, the cpu is a new part where the id is "YZX p9", the quantity is the quantity of the cpu of the custom configuration, the unit price is 400, the memory is the memory of the custom configuration;

This second statement again involves constructor calls with initialization clauses and corresponds to eight individual assignment statements that are formulated with the help of a temporary variable x:

A5: set x to a new PC configuration;
A6: set the product id of x to the product id of the custom configuration;
A7: set the cpu of x to a new part;
A8: set the id of the cpu of x to "YZX p9";
A9: set the quantity of the cpu of x to the quantity of the cpu of the custom configuration;
A10: set the unit price of the cpu of x to 400;
A11: set the memory of x to the memory of the custom configuration;
A12: set the custom configuration to x;

Executing A5 does not add a frozen expression since its right-hand side is not a path expression. Executing A6 adds the path expression "the product id of x" to the frozen path expressions. The right-hand side of A7 is not a path expression and its execution does not change the abstract state. The same statement about A7 also holds for A8. Since the path expression "the cpu of the custom configuration" is frozen, the path expression "the quantity of the cpu of the custom configuration" is frozen as well. Therefore, the execution of A9 adds "the quantity of the cpu of x" to the frozen path expressions. The right-hand side of A10 is not a path expression and the execution of this statement does not alter the abstract state. Since "the memory of the custom configuration" is frozen, the path expression "the memory of x" will be frozen as well after the execution of A11. Since the temporary variable x is not frozen, the execution of A12 will not add the left-hand side to the frozen path expressions. However, there are several frozen path expressions that can be reduced to the right-hand side x of A12, namely:

the product id of x
the quantity of the cpu of x
the memory of x

The input modification analyzer 106 (see FIG. 1) substitutes the right-hand side "x" by the left-hand side "the custom configuration" and adds the resulting expressions to the abstract state:

the product id of custom configuration
the quantity of the cpu of custom configuration
the memory of custom configuration Furthermore, input modification analyzer 106 (see FIG. 1) inspects all path expressions of the previous state that can be reduced to the left-hand side "the custom configuration":

the product id of the custom configuration
the cpu of the custom configuration
the memory of the custom configuration Input modification analyzer 106 (see FIG. 1) substitutes the left-hand side "the custom configuration" by the right-hand side "x" and checks whether the resulting path expressions are in the previous abstract state:

the product id of x
the cpu of x
the memory x

The path expression "the cpu of x" is not part of the previous state, meaning that "the cpu of the custom configuration" is removed from the resulting state. Furthermore, the temporary variable x will be deleted, meaning that all its path expressions are discarded. Hence, the abstract state after the execution of the then-branch contains the following path expressions:

the product id of custom configuration
the quantity of the cpu of custom configuration
the memory of custom configuration Since the else-branch is empty, the abstract state resulting from the else-branch is the abstract state after rule r0. Combining those two states yields the following abstract state as result of the abstract execution of r1:

the product id of the custom configuration
the cpu of the custom configuration
the quantity of the cpu of custom configuration
the memory of the custom configuration Since the path expression "the cpu of the custom configuration" is frozen, the path expression "the quantity of the cpu of custom configuration" is frozen as well, meaning that it need not be stored explicitly in this abstract state. Hence, the abstract state resulting from the execution of rule r1 is equivalent to that resulting from the execution of rule r0.

Note that the input modification analyzer 106 (see FIG. 1) removes the last element from the stack before continuing the execution.

Processing of the third rule of the custom configuration logic

Figure 10:
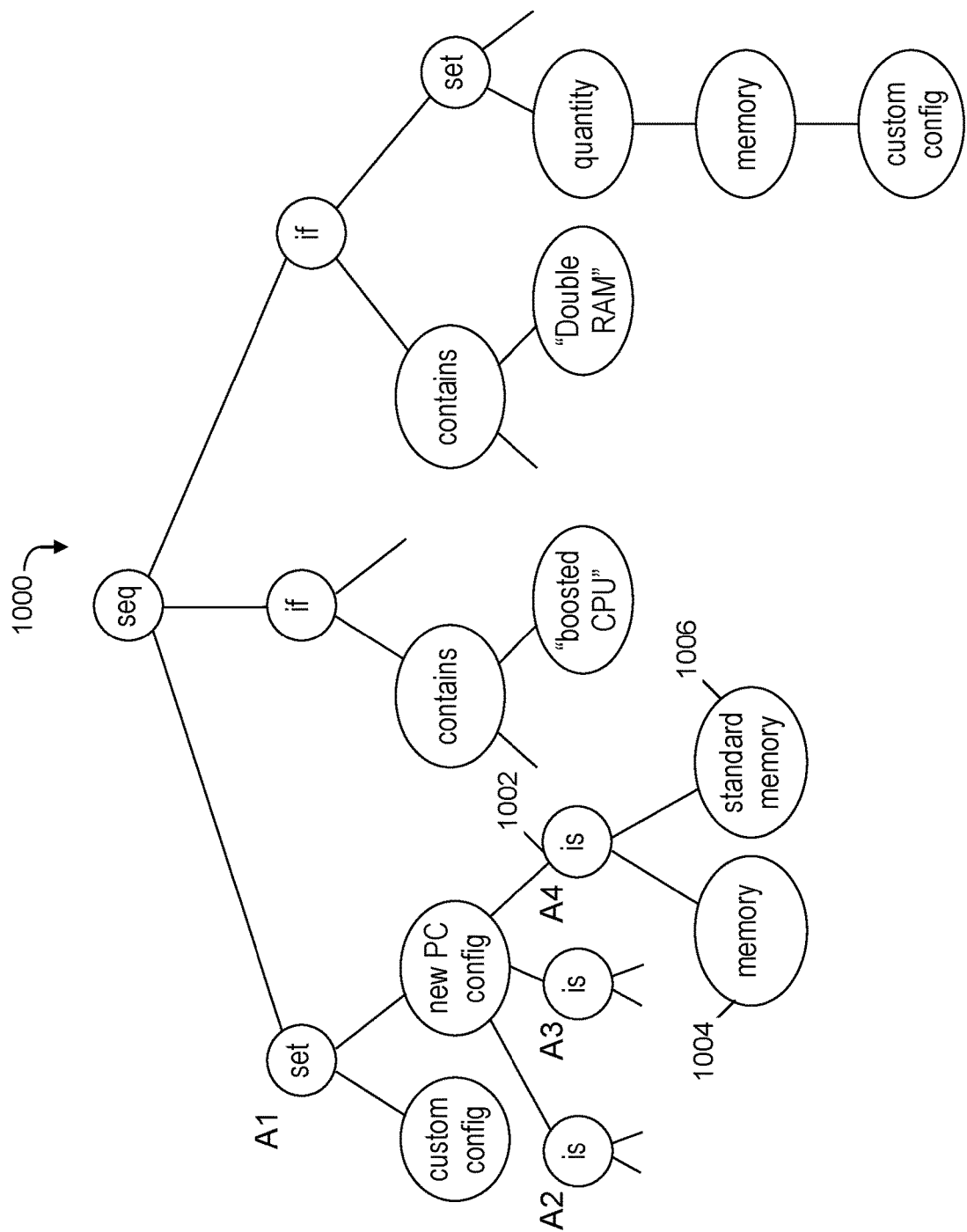
FIG. 10 depicts a correspondence between the statements in FIG. 9 and nodes of the syntax tree in FIG. 5A, in accordance with embodiments of the present invention.

The next statement in the custom configuration program is rule r2. The input modification analyzer 106 (see FIG. 1) stores the current abstract state in the stack before executing the then-branch. The then-branch consists of the statement A13: set the quantity of the memory of the custom configuration to 2* the quantity of the memory of the custom configuration When analyzing statement A13, the input modification analyzer 106 (see FIG. 1) checks whether the left-hand side "the quantity of the memory of the custom configuration" denotes the attribute value of a protected or frozen path expression. For this purpose, input modification analyzer 106 (see FIG. 1) checks whether the reduction of the left-hand side is protected or frozen in the current state. Input modification analyzer 106 (see FIG. 1) determines that the reduction "the memory of the custom configuration" is contained in the current abstract state. Hence, executing statement A13 may modify an attribute value of an input object as a side effect. The input modification analyzer 106 (see FIG. 1) therefore creates a copy request for the path expression and includes the statement A13 in the copy request. In some embodiments, input modification analyzer 106 (see FIG. 1) includes in the copy request the history of statements that caused the path expression to be frozen. As the path expression "the memory of the custom configuration" became frozen due to statement A4, this information is also included in the copy request. The histories and copy requests will not use a textual representation, but the corresponding AST nodes. FIG. 10 depicts a correspondence 1000 between the statements in FIG. 9 and nodes of the syntax tree in FIG. 5A, in accordance with embodiments of the present invention. Correspondence 1000 includes a syntax tree, which has the same nodes as syntax tree 500 (see FIG. 5A), and shows correspondences between statements A1, A2, A3 and A4 and nodes in the syntax tree. Statements A1, A2, A3, and A4 are indicated by A1, A2, A3, and A4 labels, respectively, on the syntax tree included in FIG. 10. For example, by the placement of the A4 label in the syntax tree in FIG. 10, correspondence 1000 indicates that statement A4 corresponds to node 1002 of the syntax tree in FIG. 10, along with the child nodes of node 1002 (i.e., nodes 1004 and 1006).

As the analysis of statement A13 issues a copy request for the path expression "the memory of the custom configuration," it is now assumed that "the memory of the custom configuration" has been copied. Therefore, the input modification analyzer 106 (see FIG. 1) removes "the memory of the custom configuration" from the abstract state and then executes A13. This step of removal is not shown in the trace in FIG. 9. The execution of A13 does not add any frozen path expression since the right-hand side of this statement is not a path expression. The resulting abstract state is shown in line 16 of example 900 in FIG. 9. However, when finishing the execution of rule r2, the abstract state is combined with the abstract state obtained after executing rule r1. Therefore, the final abstract state after executing r2 again contains the three elements:

the product id of the custom configuration
the cpu of the custom configuration
the memory of the custom configuration As there is no further rule, the input modification analyzer 106 (see FIG. 1) has finished the abstract execution and returns the copy request for the path expression "the memory of the custom configuration."

Building the Copy Statements

Input modification analyzer 106 (see FIG. 1) passes the copy request to the copy statement builder 108 (see FIG. 1). In one embodiment, the copy request includes the statement A13 that causes the side effect as well as the history that caused the path expression "the memory of the custom configuration" to be frozen. This history contains a single statement, namely A4. In one embodiment, the copy statement builder 108 (see FIG. 1) inserts copy statements as early as possible. Therefore, copy statement builder 108 (see FIG. 1) retrieves the first statement of the history, which is A4 (since there is only one statement in the history). The copy request does not contain a textual representation of the statement A4, but instead includes the corresponding syntax tree node. The copy statement builder 108 (see FIG. 1) therefore retrieves the syntax tree node 1004 and selects the child node 1006 (i.e., "standard memory" node) that corresponds to the right-hand side. The copy statement builder 108 (see FIG. 1) creates a new node representing an instruction for doing an exhaustive copying of the "standard memory" object. This new node is node 552 in FIG. 5B. The copy statement builder 108 (see FIG. 1) then creates a new syntax tree, which is syntax tree 550 in FIG. 5B. In the new syntax tree, the right-hand side of statement A4 is replaced by new node 552 (see FIG. 5B). Furthermore, copy statement builder 108 (see FIG. 1) sets the child node 554 (see FIG. 5B) of new node 552 (see FIG. 5B) to the "standard memory" node, because this standard memory needs to be copied.

As there is no further copy request, the syntax tree 116 (see FIG. 1) resulting from processing the first copy request represents a variant of the custom configuration program that no longer has side effects.

Impact on Equality Conditions

The insertion of copy instructions into the syntax tree may impact subsequent decision logic, such as decision logic that has expressions to test whether two path expressions have the same value (e.g., the rule for computing the price surplus of the cpu). As such, there is a discoverable impact on the decision logic by the insertion of copy instructions, but an adequate copy statement builder 108 (see FIG. 1) minimizes the impact.

Computer System

Figure 11:
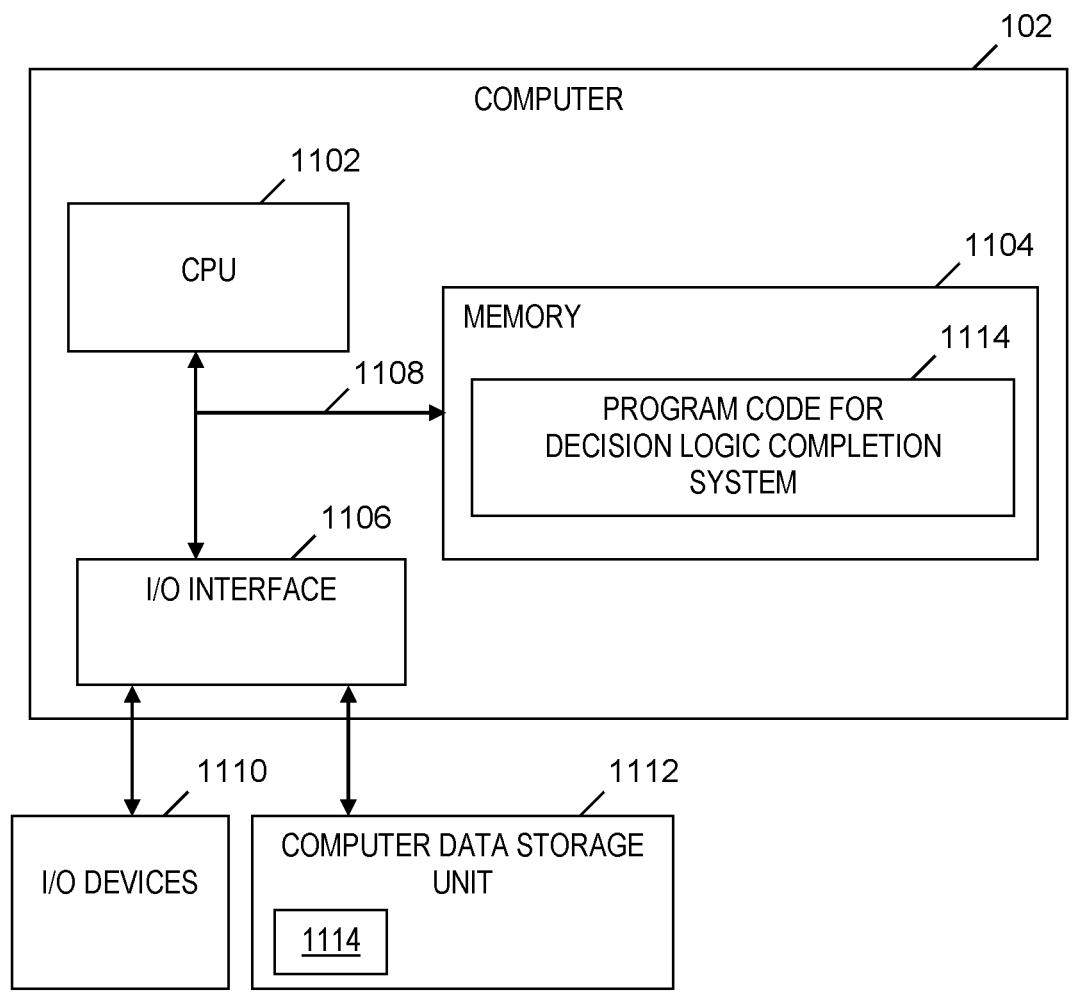
FIG. 11 is a block diagram of a computer included in the system of FIG. 1 and that implements the processes of FIG. 2, FIG. 3, and FIG. 4, in accordance with embodiments of the present invention.

FIG. 11 is a block diagram of a computer included in the system of FIG. 1 and that implements the processes of FIG. 2, FIG. 3, and FIG. 4, in accordance with embodiments of the present invention. Computer 102 is a computer system that generally includes a central processing unit (CPU) 1102, a memory 1104, an input/output (I/O) interface 1106, and a bus 1108. Further, computer 102 is coupled to I/O devices 1110 and a computer data storage unit 1112. CPU 1102 performs computation and control functions of computer 102, including executing instructions included in program code 1114 for a system that includes decision logic completion system 104 (see FIG. 1) to perform a method of completing a decision logic to avoid side effects, where the instructions are executed by CPU 1102 via memory 1104.

CPU 1102 may include a single processing unit, or be distributed across one or more processing units in one or more locations (e.g., on a client and server).

Memory 1104 includes a known computer readable storage medium, which is described below. In one embodiment, cache memory elements of memory 1104 provide temporary storage of at least some program code (e.g., program code 1114) to reduce the number of times code must be retrieved from bulk storage while instructions of the program code are executed. Moreover, similar to CPU 1102, memory 1104 may reside at a single physical location, including one or more types of data storage, or be distributed across a plurality of physical systems in various forms. Further, memory 1104 can include data distributed across, for example, a local area network (LAN) or a wide area network (WAN).

I/O interface 1106 includes any system for exchanging information to or from an external source. I/O devices 1110 include any known type of external device, including a display, keyboard, etc. Bus 1108 provides a communication link between each of the components in computer 102, and may include any type of transmission link, including electrical, optical, wireless, etc.

I/O interface 1106 also allows computer 102 to store information (e.g., data or program instructions such as program code 1114) on and retrieve the information from computer data storage unit 1112 or another computer data storage unit (not shown). Computer data storage unit 1112 includes a known computer-readable storage medium, which is described below. In one embodiment, computer data storage unit 1112 is a non-volatile data storage device, such as a magnetic disk drive (i.e., hard disk drive) or an optical disc drive (e.g., a CD-ROM drive which receives a CD-ROM disk).

Memory 1104 and/or storage unit 1112 may store computer program code 1114 that includes instructions that are executed by CPU 1102 via memory 1104 to complete a decision logic to avoid side effects. Although FIG. 11 depicts memory 1104 as including program code, the present invention contemplates embodiments in which memory 1104 does not include all of code 1114 simultaneously, but instead at one time includes only a portion of code 1114.

Further, memory 1104 may include an operating system (not shown) and may include other systems not shown in FIG. 11.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to completing a decision logic to avoid side effects. Thus, an embodiment of the present invention discloses a process for supporting computer infrastructure, where the process includes providing at least one support service for at least one of integrating, hosting, maintaining and deploying computer-readable code (e.g., program code 1114) in a computer system (e.g., computer 102) including one or more processors (e.g., CPU 1102), wherein the processor(s) carry out instructions contained in the code causing the computer system to complete a decision logic to avoid side effects. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of completing a decision logic to avoid side effects.

While it is understood that program code 1114 for completing a decision logic to avoid side effects may be deployed by manually loading directly in client, server and proxy computers (not shown) via loading a computer-readable storage medium (e.g., computer data storage unit 1112), program code 1114 may also be automatically or semi-automatically deployed into computer 102 by sending program code 1114 to a central server or a group of central servers. Program code 1114 is then downloaded into client computers (e.g., computer 102) that will execute program code 1114. Alternatively, program code 1114 is sent directly to the client computer via e-mail. Program code 1114 is then either detached to a directory on the client computer or loaded into a directory on the client computer by a button on the e-mail that executes a program that detaches program code 1114 into a directory. Another alternative is to send program code 1114 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 1114 is transmitted to the proxy server and then it is stored on the proxy server.

Another embodiment of the invention provides a method that performs the process steps on a subscription, advertising and/or fee basis. That is, a service provider can offer to create, maintain, support, etc. a process of completing a decision logic to avoid side effects. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 1104 and computer data storage unit 1112) having computer readable program instructions 1114 thereon for causing a processor (e.g., CPU 1102) to carry out aspects of the present invention.

The computer readable storage medium can be a tangible device that can retain and store instructions (e.g., program code 1114) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 1114) described herein can be downloaded to respective computing/processing devices (e.g., computer 102) from a computer readable storage medium or to an external computer or external storage device (e.g., computer data storage unit 1112) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 1114) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2, FIG. 3, and FIG. 4) and/or block diagrams (e.g., FIG. 1 and FIG. 11) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 1114).

These computer readable program instructions may be provided to a processor (e.g., CPU 1102) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 1112) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 1114) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of completing a decision logic, the method comprising:

for statements in a syntax tree of the decision logic and using a symbolic execution technique, a computer identifying one or more path expressions that refer to respective one or more input objects;

the computer detecting a statement in the decision logic that modifies an attribute value of a path expression that is included in the identified one or more path expressions and that refers to an input object included in the one or more input objects;

the computer inserting a copy instruction as a new node in the syntax tree so that the attribute value of the path expression is a copy of the input object, and in response to the step of inserting, the computer preventing the path expression from modifying the input object the computer detecting an assignment action in the decision logic that modifies the attribute value of the path expression and determining that the path expression does not include an input variable; and the computer determining that the attribute value of the path expression is equal to an attribute value of another path expression that includes the input variable, wherein the attribute value of the other path expression is not permitted to be modified, and wherein the detecting the statement is based on the assignment action being detected, the path expression not including the input variable, and the attribute value of the path expression being equal to the attribute value of the other path expression that includes the input variable.

2. The method of claim 1, further comprising responsive to the inserting, the computer breaking an equality between the path expression and the input object, which avoids a side effect caused by the path expression modifying the input object.

3. The method of claim 1, further comprising the computer generating a copy request to generate the copy instruction and perform the inserting the copy instruction, wherein the copy request includes the statement that modifies the attribute value and one or more other statements that cause the path expression to be a frozen path expression whose attribute value is not permitted to be modified by an assignment statement.

4. The method of claim 3, further comprising the computer employing a copy strategy to generate and insert the copy instruction, wherein a sequence of other statements cause the path expression to be the frozen path expression, and wherein the copy strategy is selected from the group consisting of inserting the copy instruction at a first statement in the sequence of the other statements and inserting the copy instruction at the statement that modifies the attribute value.

5. The method of claim 1, further comprising the computer receiving a completed decision logic based on the syntax tree having the inserted copy instruction, wherein the completed decision logic is free of one or more side effects that had been a result of an initial version of the decision logic.

6. The method of claim 5, wherein the receiving the completed syntax tree includes receiving a variant of an initial version of the decision logic, wherein logic of the variant matches logic of the initial version, except for one or more expressions that test whether two path expressions have the same value, which are affected by the copy instruction being inserted.

7. The method of claim 1, further comprising:

providing at least one support service for at least one of creating, integrating, hosting, maintaining, and deploying computer readable program code in the computer, the program code being executed by a processor of the computer to implement the identifying the one or more path expressions, the detecting the statement in the decision logic that modifies the attribute value of the path expression, the inserting the copy instruction as the new node in the syntax tree, the preventing the path expression from modifying the input object, the detecting the assignment action, and the determining that the attribute value of the path expression is equal to the attribute value of the other path expression.

8. A computer program product for completing a decision logic, the computer program product comprising a computer readable storage medium having computer readable program code stored on the computer readable storage medium, wherein the computer readable storage medium is not a transitory signal per se, the computer readable program code being executed by a central processing unit (CPU) of a computer system to cause the computer system to perform a method comprising:

for statements in a syntax tree of the decision logic and using a symbolic execution technique, the computer system identifying one or more path expressions that refer to respective one or more input objects;

the computer system detecting a statement in the decision logic that modifies an attribute value of a path expression that is included in the identified one or more path expressions and that refers to an input object included in the one or more input objects;

the computer system inserting a copy instruction as a new node in the syntax tree so that the attribute value of the path expression is a copy of the input object, and in response to the inserting, the computer system preventing the path expression from modifying the input object;

the computer system detecting an assignment action in the decision logic that modifies the attribute value of the path expression and determining that the path expression does not include an input variable; and the computer system determining that the attribute value of the path expression is equal to an attribute value of another path expression that includes the input variable, wherein the attribute value of the other path expression is not permitted to be modified, and wherein the detecting the statement is based on the assignment action being detected, the path expression not including the input variable, and the attribute value of the path expression being equal to the attribute value of the other path expression that includes the input variable.

9. The computer program product of claim 8, wherein the method further comprises responsive to the inserting, the computer system breaking an equality between the path expression and the input object, which avoids a side effect caused by the path expression modifying the input object.

10. The computer program product of claim 8, wherein the method further comprises the computer system generating a copy request to generate the copy instruction and perform the inserting the copy instruction, wherein the copy request includes the statement that modifies the attribute value and one or more other statements that cause the path expression to be a frozen path expression whose attribute value is not permitted to be modified by an assignment statement.

11. The computer program product of claim 10, wherein the method further comprises the computer system employing a copy strategy to generate and insert the copy instruction, wherein a sequence of other statements cause the path expression to be the frozen path expression, and wherein the copy strategy is selected from the group consisting of inserting the copy instruction at a first statement in the sequence of the other statements and inserting the copy instruction at the statement that modifies the attribute value.

12. The computer program product of claim 8, wherein the method further comprises the computer system receiving a completed decision logic based on the syntax tree having the inserted copy instruction, wherein the completed decision logic is free of one or more side effects that had been a result of an initial version of the decision logic.

13. A computer system comprising:
a central processing unit (CPU);

a memory coupled to the CPU; and
a computer readable storage device coupled to the CPU, the computer readable storage device containing instructions that are executed by the CPU via the memory to implement a method of completing a decision logic, the method comprising the steps of:
  for statements in a syntax tree of the decision logic and using a symbolic execution technique, the computer system identifying one or more path expressions that refer to respective one or more input objects;
  the computer system detecting a statement in the decision logic that modifies an attribute value of a path expression that is included in the identified one or more path expressions and that refers to an input object included in the one or more input objects;
  the computer system inserting a copy instruction as a new node in the syntax tree so that the attribute value of the path expression is a copy of the input object, and in response to the step of inserting, the computer system preventing the path expression from modifying the input object;
  the computer system detecting an assignment action in the decision logic that modifies the attribute value of the path expression and determining that the path expression does not include an input variable; and
  the computer system determining that the attribute value of the path expression is equal to an attribute value of another path expression that includes the input variable, wherein the attribute value of the other path expression is not permitted to be modified, and wherein the step of detecting the statement is based on the assignment action being detected, the path expression not including the input variable, and the attribute value of the path expression being equal to the attribute value of the other path expression that includes the input variable.

14. The computer system of claim 13, wherein the method further comprises responsive to the inserting, the computer system breaking an equality between the path expression and the input object, which avoids a side effect caused by the path expression modifying the input object.

15. The computer system of claim 13, wherein the method further comprises the computer system generating a copy request to generate the copy instruction and perform the inserting the copy instruction, wherein the copy request includes the statement that modifies the attribute value and one or more other statements that cause the path expression to be a frozen path expression whose attribute value is not permitted to be modified by an assignment statement.

16. The computer system of claim 15, wherein the method further comprises the computer system employing a copy strategy to generate and insert the copy instruction, wherein a sequence of other statements cause the path expression to be the frozen path expression, and wherein the copy strategy is selected from the group consisting of inserting the copy instruction at a first statement in the sequence of the other statements and inserting the copy instruction at the statement that modifies the attribute value.

17. The computer system of claim 13, wherein the method further comprises the computer system receiving a completed decision logic based on the syntax tree having the inserted copy instruction, wherein the completed decision logic is free of one or more side effects that had been a result of an initial version of the decision logic.

* * * * *